US008344303B2

(12) United States Patent
Elgersma et al.

(10) Patent No.: US 8,344,303 B2
(45) Date of Patent: Jan. 1, 2013

(54) PROJECTILE 3D ATTITUDE FROM 3-AXIS MAGNETOMETER AND SINGLE-AXIS ACCELEROMETER

(75) Inventors: Michael R. Elgersma, Plymouth, MN (US); Vibhor L. Bageshwar, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 313 days.

(21) Appl. No.: 12/916,936

(22) Filed: Nov. 1, 2010

(65) Prior Publication Data

US 2012/0104150 A1 May 3, 2012

(51) Int. Cl.
*F42B 15/01* (2006.01)
*G06F 19/00* (2011.01)
*F42B 15/00* (2006.01)

(52) U.S. Cl. ....... 244/3.21; 244/3.1; 244/3.15; 702/127; 702/150; 702/151

(58) Field of Classification Search ............ 244/3.1–3.3, 244/158.1, 164, 166; 342/61, 62; 702/127, 702/150, 151; 73/861, 861.77; 33/300, 355 R, 33/356; 701/1, 3, 4
See application file for complete search history.

(56) References Cited

U.S. PATENT DOCUMENTS

| | | | | |
|---|---|---|---|---|
| 3,291,419 | A * | 12/1966 | Montague et al. | 244/3.15 |
| 3,834,653 | A * | 9/1974 | Perkel | 244/3.21 |
| 3,937,423 | A * | 2/1976 | Johansen | 244/3.22 |
| 4,062,509 | A * | 12/1977 | Muhlfelder et al. | 244/3.2 |
| 4,504,912 | A * | 3/1985 | Bruderle et al. | 244/166 |
| 5,170,566 | A * | 12/1992 | Fowler et al. | 33/356 |
| 5,953,683 | A * | 9/1999 | Hansen et al. | 702/150 |
| 6,163,021 | A | 12/2000 | Mickelson | |
| 6,349,652 | B1 | 2/2002 | Hepner et al. | |
| 6,398,155 | B1 * | 6/2002 | Hepner et al. | 244/3.15 |
| 6,493,651 | B2 * | 12/2002 | Harkins et al. | 702/151 |
| 6,636,826 | B1 * | 10/2003 | Abe et al. | 702/151 |
| 7,023,380 | B2 | 4/2006 | Schneider | |
| 7,032,857 | B2 * | 4/2006 | Hua | 244/3.15 |
| 7,105,790 | B2 * | 9/2006 | Lamorlette | 244/3.2 |
| 7,249,730 | B1 * | 7/2007 | Flippen, Jr. | 244/3.15 |
| 7,341,221 | B1 * | 3/2008 | Wilson | 244/3.21 |
| 7,566,027 | B1 * | 7/2009 | Johnson et al. | 244/3.21 |

(Continued)

OTHER PUBLICATIONS

Bageshwar et al., "A Stochastic Observability Test for Discrete-Time Kalman Filters", "Journal of Guidance, Control, and Dynamics", Jul. 8, 2009, pp. 1356-1370, vol. 32, No. 4.

(Continued)

*Primary Examiner* — Bernarr Gregory
(74) *Attorney, Agent, or Firm* — Fogg & Powers LLC

(57) ABSTRACT

A method to determine roll angle, pitch angle, and heading angle of a spinning projectile during a flight of the spinning projectile is provided. The method includes providing a magnetic unit vector in an inertial frame of the projectile at a projectile launch location prior to launch of the projectile; determining a magnetic unit vector in a body frame and in an inertial frame of the spinning projectile during the flight of the spinning projectile; determining a velocity unit vector in the body frame and in the inertial frame of the spinning projectile during the flight of the spinning projectile; and calculating the roll angle, the pitch angle, and the heading angle of the spinning projectile during the flight of the spinning projectile, regardless of the spin rate of the projectile. The roll angle and the pitch angle of the spinning projectile form an attitude of the spinning projectile.

20 Claims, 12 Drawing Sheets

U.S. PATENT DOCUMENTS

| | | | | |
|---|---|---|---|---|
| 7,977,613 | B2 * | 7/2011 | Rastegar et al. | 244/3.1 |
| 8,229,606 | B2 * | 7/2012 | Vos et al. | 244/3.15 |
| 8,258,999 | B2 * | 9/2012 | Rastegar et al. | 342/62 |
| 2009/0114039 | A1 * | 5/2009 | Schultze et al. | 73/861.77 |
| 2009/0272839 | A1 | 11/2009 | Clingman | |

OTHER PUBLICATIONS

Bageshwar, "Quantifying Performance Limitations of Kalman Filters in State Vector Estimation Problems", "Department of Aerospace Engineering and Mechanics Ph.D. Dissertation", Apr. 2008, Publisher: University of Minnesota.

Bageswhar et al. , "Inertially-Aided Vector Matching Algorithm for Attitude Determination of Spin Stabilized Satellites ", "AIAA Guidance, Navigation and Control Conference", 2008.

Cooper et al. , "Flight Dynamic Response of Spinning Projectiles to Lateral Impulsive Loads", "Journal of Dynamic Systems, Measurement, and Control", Sep. 2004, pp. 605-613, vol. 126.

Harkins, "A Unique Solution for Flight Body Angular Histories", Nov. 2007, Publisher: Army Research Laboratory.

Ilg, "Guidance, Navigation, and Control for Munitions ", "Ph.D. Dissertation", May 2008, Publisher: Drexel University.

Kreichauf et al. , "Estimation of the Roll Angle in a Spinning Guided Munition Shell", 2006, Publisher: Honeywell Laboratories, Published in: Minneapolis, MN.

Michalareas et al. , "Spacecraft Attitude Estimation Based on Magnetometer Measurements and the Covariance Intersection Algorithm ", 2002, Publisher: IEEE.

Psiaki, "Global Magnetometer-Based Spacecraft Attitude and Rate Estimation", "Journal of Guidance, Control, and Dynamics", Mar. 4, 2004, pp. 240-250, vol. 27, No. 2.

Sivan et al. , "Wind Tunnel Tests of the Aerodynamic Characteristics of A 155MM Artillery Shell", "http://www.dtic.mil/cgi-bin/GetTRDoc?AD=ADA227749&Location=U2&doc=GetTRDoc.pdf", Aug. 1989, Published in: Melbourne, Victoria.

Wahba, "Problem 65-1, A Least Squares Estimation of Satellite Attitude", "Siam Review", Jul. 1966, pp. 384-386, vol. 8, No. 3.

"Wikipedia: 152 MM GUN M1935 (BR-2)", "http://en.wikipedia.org/wiki/152_mm_gun_M1935_(Br-2)", Accessed on Oct. 5, 2010, Publisher: Wikipedia.

"Wikipedia: External Ballistics", "http://en.wikipedia.org/wiki/External_ballistics", Accessed on Oct. 5, 2010, Publisher: Wikipedia.

"Wikipedia: Rifling", "http://en.wikipedia.org/wiki/Rifling", Accessed on Oct. 5, 2010, Publisher: Wikipedia.

Wilson, Michael J. , "Attitude Determination With Magnetometers for Gun-Launched Munitions", Aug. 2004, Publisher: Army Research Laboratory.

* cited by examiner

PROJECTILE 3D ATTITUDE FROM 3-AXIS MAGNETOMETER AND SINGLE-AXIS ACCELEROMETER

BACKGROUND

A projectile fired from a rifled barrel spins too rapidly for inexpensive rate gyroscopes to accurately measure the spin rate, attitude, and heading angle of the projectile. Typically, an inexpensive rate gyroscope is unable to measure spin rates over 100 Hz. Thus, projectiles that incorporate inexpensive rate gyroscopes are typically despun after launch in order to reduce the spin rate of the projectile to less than 100 Hz. For example, the spin rate of a despun projectile is slowed down by a protrusion of wings or buffers from the projectile body. In this manner, the inexpensive rate gyroscopes can measure the attitude and heading angle of the projectile in flight. An exemplary inexpensive rate gyroscope is a micro-electro-mechanical system (MEMS) rate gyroscope.

SUMMARY

The present application relates to method to determine roll angle, pitch angle, and heading angle of a spinning projectile during a flight of the spinning projectile. The method includes providing a magnetic unit vector in an inertial frame of the projectile at a projectile launch location prior to launch of the projectile; determining a magnetic unit vector in a body frame and in an inertial frame of the spinning projectile during the flight of the spinning projectile; determining a velocity unit vector in the body frame and in the inertial frame of the spinning projectile during the flight of the spinning projectile; and calculating the roll angle, the pitch angle, and the heading angle of the spinning projectile during the flight of the spinning projectile, regardless of the spin rate of the projectile. The roll angle and the pitch angle of the spinning projectile form an attitude of the spinning projectile.

DRAWINGS

In accordance with common practice, the various described features are not drawn to scale but are drawn to emphasize features relevant to the present invention. Like reference characters denote like elements throughout figures and text.

DETAILED DESCRIPTION

Figure 1:
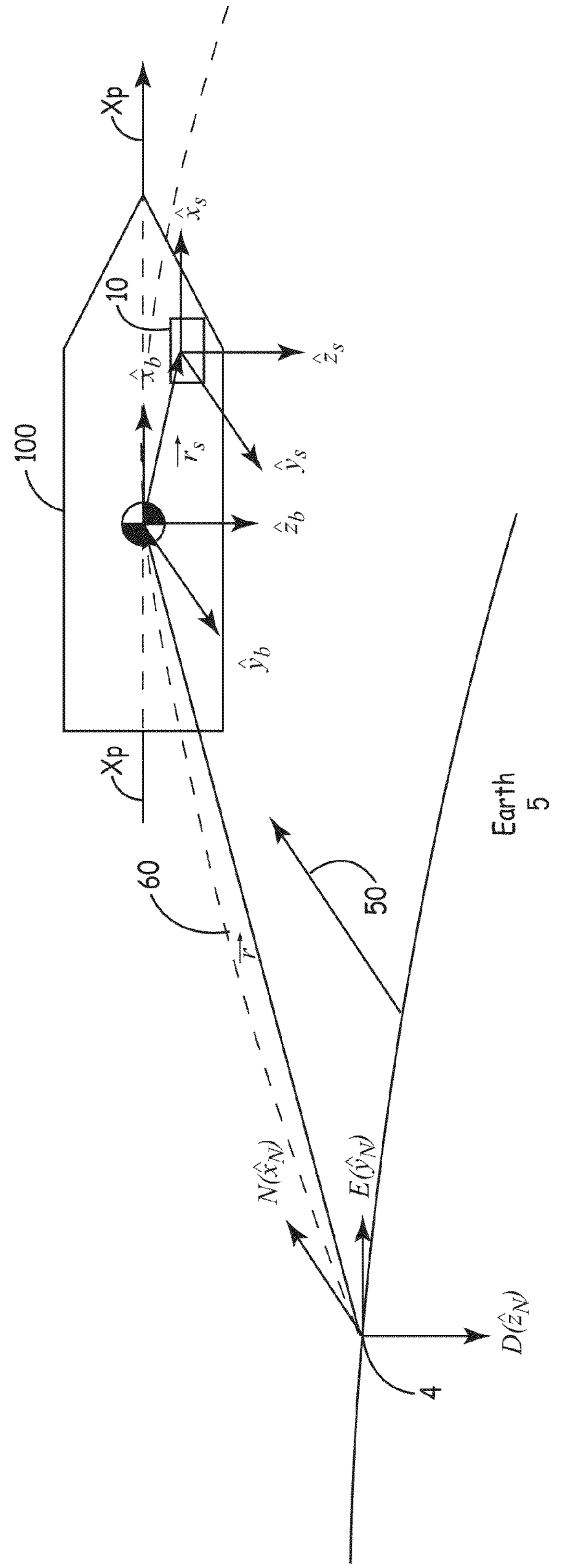
FIG. 1 shows an embodiment of the projectile and three reference frames in accordance with the present invention.

The apparatus described herein is used in a spinning projectile to calculate a three-dimensional attitude in a spinning projectile, even when the projectile spins with a spin rate greater than 100 Hz. Embodiments of the apparatus include a three-axis magnetometer, a single-axis accelerometer orientated with the sense axis aligned to the spin axis of the spinning projectile, and at least one algorithm executable by a processor to calculate the three-dimensional attitude of the projectile during the projectile's traversal from a launch location to a final destination. In one implementation of this embodiment, the at least one algorithm includes multiple software modules.

Projectiles without guidance, navigation, and control capability or dumb projectiles (e.g., dumb munitions) are unable to determine their three-dimensional (3D) attitude (i.e., a roll angle, a pitch angle, and a heading angle). The apparatus described herein can be attached to (or inserted into) dumb munitions in order to turn them into smart munitions that are able to detect and control their 3D attitude during a flight from a launch location to a final destination. Thus, available stockpiles of dumb munitions can be inexpensively retrofitted as smart munitions with the apparatus describe herein.

There are several disadvantages of firing projectiles without guidance, navigation, and control capability: 1) the projectile could miss its intended target; 2) the projectile launch system is exposed to a potential adversary; 3) the cost of each projectile and its launch; and 4) the potential collateral damage should the projectile miss its intended target. Given the existing stockpile of projectiles that are not equipped with guidance, navigation, and control systems capable of providing closed loop control, the advantages of equipping the existing stockpile of projectiles with guidance, navigation, and control systems are as follows: 1) the current inventory of projectiles can be used in more demanding applications; 2) the projectiles do not have to be replaced; and 3) the launch systems do not have to be replaced.

The three-dimensional (3D) attitude of the projectile is stabilized in two ways. First, the 3D attitude of a projectile is stabilized using canards. These projectiles are typically slow spinning (<20 Hz), or despun, and require in-flight 3D attitude control and in-flight trajectory guidance. Second, the 3D attitude of the projectile is spin stabilized. These projectiles are fast spinning projectiles. A fast spinning projectile is dynamically stabilized due to its spin rate and is inherently more stable than a despun projectile. Therefore, in ideal conditions, fast spinning projectiles require no control effort to stabilize the 3D attitude whereas slow spinning projectiles require control effort to stabilize the 3D attitude. However, fast spinning projectiles still require in-flight trajectory guidance because disturbance forces including tip-off rates, launch system exit velocity variations, wind gusts, and other meteorological conditions can cause the projectile to miss its intended target.

The embodiments of apparatuses and methods described herein provide an attitude and heading reference system (AHRS) for accurate, reliable, and low-cost guidance and navigation that can be attached to existing projectiles in a low-cost, projectile. For example, the apparatus can be attached to a projectile in a screw-on nose kit. The nose kits include an AHRS that is useful even for fast spinning projectiles, such as gun-launched projectiles with initial angular velocities greater than 100 Hz.

FIG. 1 shows an embodiment of the projectile 100 and three reference frames $F_N$, $F_b$, $F_s$ in accordance with the present invention. The projectile 100 includes an apparatus 10 to measure the 3D attitude of the projectile 100 after it is launched and as it spins during a flight from the launch location 4 to a final destination (not shown). The apparatus 10 is also referred to herein as "projectile attitude and heading angle reference system 10." In one implementation of this embodiment, the apparatus 10 is part of a nose kit that is attached to a projectile 100. The apparatus 10 is described in detail below with reference to FIG. 2. At the projectile launch location 4, the earth 5 has an exemplary local magnetic field the direction of which is indicated by the arrow 50. The magnetic field 50 of the earth 5 does not vary significantly over that distance that a typical projectile 100 travels (e.g., tens of kilometers).

FIG. 1 shows the three reference frames used to specify the attitude and heading angle of the projectile 100 traversing the nearly ballistic trajectory 60. The first reference frame is the North East Down (NED) frame, $F_N$, which is also referred to herein as the "navigation frame $F_N$" or "inertial frame $F_N$". The NED frame, $F_N$, is spanned by the vectors ($X_N$, $Y_N$, $Z_N$). The NED frame, $F_N$, has an origin located at the projectile launch position 4 on the earth 5. The N-axis, or $\hat{x}_N$-axis, points in the local North direction. The E-axis, or $\hat{y}_N$-axis, points in the local East direction. The $\hat{x}_N$-$\hat{y}_N$ plane can be considered a local horizontal, or local level, plane. The D-axis, or $\hat{z}_N$-axis, points in the local Down direction. Specifically, the $\hat{z}_N$-axis is aligned to the earth's gravitational force and points down toward the center of the earth 5. Thus, the frame $F_N$ is a local vertical local horizontal frame (North, East and Down or NED) that is assumed to be inertial.

The second frame is a projectile body frame, $F_b$, which is spanned by vectors ($X_b$, $Y_b$, $Z_b$). The projectile's body frame, $F_b$, is assumed to be the projectile's principal axis frame. The origin of the body frame $F_b$ is located at the center of mass of the projectile 100. The position vector, $\vec{r}$, specifies the origin of the body frame $F_b$ relative to the navigation frame $F_N$. Without loss of generality, the body frame $F_b$ x-axis, or $\hat{x}_b$-axis, is assumed to point to the front of the projectile 100, the body frame $F_b$ y-axis, or $\hat{y}_b$-axis, coincides with a principal axis normal to the $\hat{x}_b$-axis, and the body frame $F_b$ z-axis, or $\hat{z}_b$-axis, coincides with a principal axis normal to the $\hat{x}_b$- and $\hat{y}_b$-axes.

The third frame is a sensor measurement frame $F_s$ which is spanned by vectors ($X_s$, $Y_s$, $Z_s$). The sensor measurement frame $F_s$ specifies the orientation of the sensor measurement axes. The origin of the sensor measurement frame $F_s$ is located at the sensor position on the projectile 100. The position vector $\vec{r}_s$ specifies the origin of the sensor measurement frame $F_s$ relative to the body frame $F_b$. The sensors locations are fixed on the projectile and, thus, the orientation of the sensor measurement frame $F_s$ relative to the body frame $F_B$ is fixed and $\vec{r}_s$ is fixed. The principal axis $\hat{x}_b$ of the projectile 100 is also the spin axis $X_p$ around which the projectile 100 spins upon launch. The spin axis $X_p$ is parallel to the velocity vector $\vec{v}$ of the spinning projectile 100 during an initial phase of the flight of the spinning projectile 100.

Figure 2:
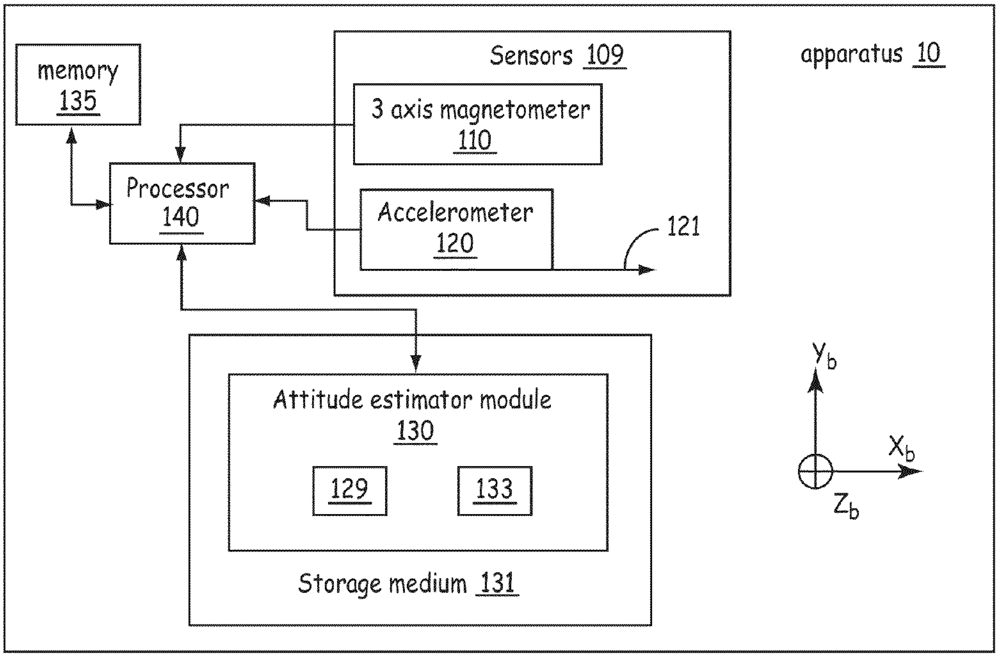
FIGS. 2 and 3 show embodiments of an apparatus used to measure a three-dimensional attitude of a spinning projectile during a flight of the spinning projectile in accordance with the present invention.
Figure 3:
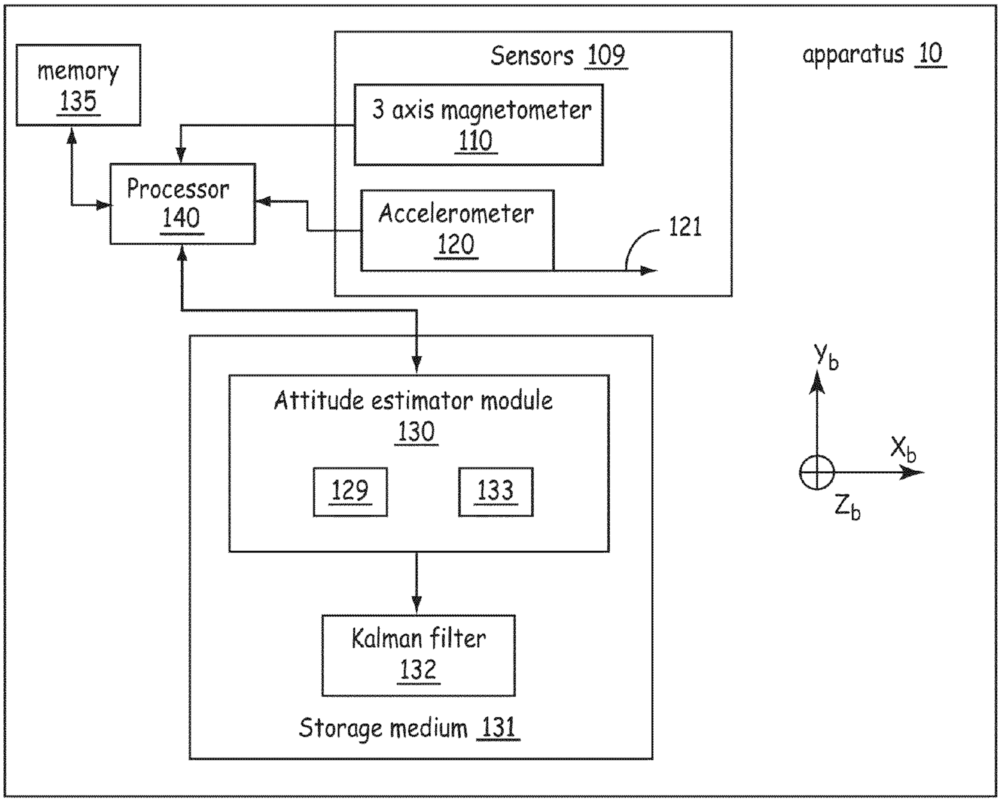

FIGS. 2 and 3 show embodiments of an apparatus used to measure a three-dimensional attitude of a spinning projectile 100 during a flight of the spinning projectile 100 in accordance with the present invention. FIG. 2 shows an embodiment of an apparatus 10 that includes sensors 109, a processor 140, a memory 135, and an attitude estimator module 130 in a non-transitory storage medium 131. The memory 135 stores inertial data and the magnetic unit vector in the inertial frame of the projectile 100 prior to the launch. The magnetic unit vector is provided to the processor 140 on the projectile 100 from the three-axis magnetometer 110. The processor 140 executes algorithms in the attitude estimator module 130. The attitude estimator module 130 includes a low-pass filter 129 that is applied to an accelerometer output to estimate drag. The attitude estimator module 130 also includes a vector matching algorithm 133.

The sensors 109 include the three-axis magnetometer 110 and the single-axis accelerometer 120 aligned with the projectile's spin axis $X_p$ to measure the projectile's attitude (pitch angle and roll angle) and heading angle. In the embodiments described herein, the measurement axes of the three-axis magnetometer 110 are parallel to the principal axes of the projectile 100 and the measurement axis 121 of the single-axis accelerometer 120 is aligned with the spin axis $X_p$ of the projectile 100. The "single-axis accelerometer 120" is also referred to herein as "accelerometer 120," and as "spin-axis accelerometer 120." The sensors 109 are not subject to frequency jamming (as are GPS sensors), and are not sensitive to environmental conditions of the launch site or time, such as cloud cover (as are sun sensors and star trackers). In one implementation of this embodiment, the low cost sensors are micro-electro-mechanical system (MEMS) sensors that can withstand 20 KG forces.

The sense axis 121 of the single-axis accelerometer 120 is oriented parallel to the velocity vector $\vec{v}$ of the spinning projectile 100 during the flight of the spinning projectile 100. Specifically, prior to launch of the projectile 100, the sense axis 121 of the accelerometer 120 is set to be parallel to the $\hat{x}_b$-axis of the body frame of the projectile 100.

The three-axis magnetometer 100 measures the local magnetic field 50 of the earth 5 and outputs information indicative of the local magnetic field 50 to the processor 140 prior to launch of the projectile 100 and during the flight of the projectile 100. The accelerometer 120 measures the velocity of the spinning projectile 100 and outputs information indicative of the velocity to the processor 140 during the flight of the projectile 100.

The processor 140 is communicatively coupled to receive an output from the sensors 109. The processor 140 is communicatively coupled with the memory 135 and is operable to retrieve the magnetic unit vector in the inertial frame of the projectile 100 that was stored prior to launch during execution of the algorithms in the attitude estimator module 130.

FIG. 3 shows an embodiment of an apparatus 11 used to measure a three-dimensional attitude of a spinning projectile 100 during a flight of the spinning projectile 100 in accordance with the present invention. The apparatus 11 differs from apparatus 10 in that the non-transitory storage medium 131 also includes a Kalman filter 132 that is communicatively coupled to the attitude estimator module 130. In the apparatus 11, an output from the attitude estimator module 130 is provided to the Kalman filter 132, which provides additional processing. In one implementation of this embodiment, the Kalman filter 132 computes estimates of the attitude and heading angle of the spinning projectile 100.

The operation of the apparatus 10 is now described with reference to FIGS. 1 and 2. The same description is also applicable with reference to FIGS. 1 and 3. The magnetic field 50 is constant in the inertial frame along the trajectory 60 of the projectile 100 and is measured by the 3-axis magnetometer 110 in the moving body frame ($X_b$, $Y_b$, $Z_b$) of the projectile 100. The 3-axis magnetometer 110 provides the x, y, z components of the magnetic field 50 in the body frame ($X_b$, $Y_b$, $Z_b$). The x, y, z components of the magnetic field 50 in the inertial frame ($X_N$, $Y_N$, $Z_N$) are known from the pre-launch conditions. In one implementation of this embodiment, the x, y, z components of the magnetic field 50 in the inertial frame ($X_N$, $Y_N$, $Z_N$) are stored in the memory 135.

The attitude estimator module 130 (FIGS. 2 and 3) includes algorithms that: use a low-pass filter 129 on the accelerometer measurements to compute the drag acting on the projectile 100; estimate the velocity vector of the projectile resolved in the inertial frame 100; estimate the velocity vector of the projectile resolved in the body frame; generate a 3×3 unit vector matrix; invert the 3×3 unit vector matrix; and multiply the inverted 3×3 unit vector matrix and non-inverted 3×3 unit vector matrix to solve for Wahba's problem. Wahba's problem is described in the article entitled "A Least Squares Estimate of Satellite Attitude" that is published in SIAM Review, Vol. 8, No. 3, (1966) 384-386, and which is incorporated herein by reference in its entirety.

The attitude estimator module 130 uses the x, y, z components of the magnetic field 50 in the inertial frame ($X_N$, $Y_N$, $Z_N$) to the x, y, z components of the magnetic field 50 in the body frame ($X_b$, $Y_b$, $Z_b$) to generate the direction cosine matrix. However, this direction cosine matrix is not unique. The accelerometer 120 provides the extra measurement needed to determine the direction cosine matrix uniquely. The algorithms (such as vector matching algorithm 133) used by the attitude estimator module 130 for these functions are shown and described below.

The accelerometer 120 measures the specific force acting along the spin axis of the projectile 100 and provides information indicative of how much the projectile 100 is slowing down due to air drag. During the initial phase of the propagation, the velocity changes are only due to air drag on the projectile 100 and are not due to nutation of the projectile 100. Since the velocity vector $\vec{v}$ and the magnetic field vector are known in both the inertial frame $F_N$ and in the body frame $F_b$, the direction cosine matrix between the two frames can be determined uniquely.

The apparatus 10 measures the three-dimensional attitude of the projectile 100 during the flight. If needed, a correction can be supplied to the projectile 100 to reorient the projectile 100 so that the projectile 100 is back on the trajectory required for the projectile 100 to reach the final destination. An internal correction signal is generated by the processor 140 (FIGS. 2 and 3) to adjust the orientation of the projectile 100 as required to keep the projectile 100 on track to the final destination. Techniques to reorient the projectile 100 are known in the art and can be applied after the three-dimensional attitude of the projectile 100 is known. Since the 3D attitude of the projectile 100 is internally adjusted and the location of the projectile 100 is not communicatively coupled to any external system, there is no possibility of jamming the sensor measurements or correction signals to or from the projectile 100 by a hacker.

A velocity vector and direction cosine matrix are determined for a rapidly spinning, nutating, and precessing projectile 100 whose center of gravity is following the nearly ballistic trajectory 60 using the apparatus 10 mounted on the projectile 100 in the manner described below. This velocity vector and direction cosine matrix are determined using sensor data from only the 3-axis magnetometer 110 and the single-axis accelerometer 120 with the sense axis 121 (input axis 121) along the spin axis $X_p$.

First, the unit vectors of the velocity vector in both the body frame $F_b$ and inertial frame $F_N$ are determined. The unit vectors of the velocity vector in both the body frame $F_b$ and inertial frame $F_N$ is and the known or measured unit vectors of the magnetic field vector 50 in both body frame $F_b$ and inertial frame $F_N$ are used to formulate Wahba's problem. Wahba's problem is used to compute a least squares estimate of the direction cosine matrix between the projectile's navigation frame $F_N$ and body frame $F_b$.

Given a set of vectors, $u_1^b, u_2^b, \ldots, u_n^b\ \forall n \geqq 2$, measured in the body frame $F_b$ and the same set of vectors known in the navigation frame $F_N$, $u_1^N, u_2^N, \ldots, u_n^N\ \forall n \geqq 2$, the direction cosine matrix that minimizes the performance index is computed:

$$J_{WP} = \sum_{i=2}^{n} \|u_i^b - C_{bN} u_i^N\|^2 \tag{1.1}$$

where $C_{bN}$ refers to the direction cosine matrix between $F_N$ and $F_b$. As applied herein, the superscript following a matrix indicates that the scalar components of the corresponding vector are resolved relative to the basis vectors of the reference frame indicated by the superscript.

In this approach, the direction cosine matrix is computed by matching at least two vectors that are measured in the body frame $F_b$ to the same set of vectors that are known, or modeled, in the navigation frame $F_N$. A unique solution to Wahba's problem requires at least two non-zero, non-collinear vectors because at least two vectors are required to uniquely define a plane. Therefore, if only one vector measurement is available, then Wahba's problem does not have a unique solution because there is a rotational ambiguity about the axis aligned with the vector measurement.

Nominally, a spinning projectile in free-fall is subject to only gravitational force. In this case, the projectile's center of mass follows a parabolic trajectory, and the projectile's spin axis is tangent to this parabolic trajectory and is coincident with the projectile's velocity vector. However, spinning projectiles are subject to aerodynamic forces such as drag and disturbance forces such as tip-off rates, wind gusts, and other meteorological conditions. These aerodynamic and disturbance forces cause the projectile's center of mass to deviate from the parabolic trajectory and the projectile's spin axis to precess and nutate about the tangent to the projectile's trajectory. The precession and nutation angles are, typically, small. The projectile's velocity vector is coincident with the tangent to the projectile's trajectory.

The attitude and heading angle of the projectile 100 are not observable using a vector measurement from the three-axis magnetometer 110 at any single epoch. However, the measurements of the single-axis accelerometer 120 can be manipulated to provide a measurement of the projectile's velocity vector. If the magnetic field vectors in the navigation frame $F_N$ and body frame $F_b$ are not parallel to the projectile's velocity vectors in the navigation frame $F_N$ and body frame $F_b$, then the accelerometer measurements can resolve the rotational ambiguity inherent in a single three-axis magnetometer measurement. Since the measurement axis 121 of the accelerometer 120 is aligned with the projectile's spin axis $X_p$, the accelerometer 120 measures components of the projectile's rotational and linear acceleration.

The vector matching algorithm 133 is used to determine the direction cosine matrix between the projectile's navigation frame and body frame at a single epoch using the following procedure: the local Earth magnetic field vector is measured using the three-axis magnetometer 110; a vector matching algorithm 133 in the attitude estimator module 130 is provided with the local Earth magnetic field vector 50 at the launch location 4 prior to launch of the projectile 100; the specific force of the projectile 100 is measured along its spin axis $X_p$; the accelerometer measurement is filtered to determine the magnitude of the projectile's various acceleration components; the filtered accelerometer measurements are used in combination with the magnetometer measurements to determine the projectile's velocity vector in the projectile's navigation frame $F_N$ and body frame $F_b$. As defined herein the "specific force" is the force measured by the accelerometer 120.

The following assumptions regarding the reference frames are made to enable dynamic analysis of the projectile: the NED frame is the inertial frame $F_N$; the origin of the NED frame is at the projectile's launch site; the direction of the NED frame axes are fixed during the projectile's flight; the projectile's body frame $F_b$ is a principal axis frame.

The following assumptions regarding the sensors 109 are made to enable dynamic analysis of the projectile 100: the sensor locations are fixed on the projectile; the origin of the sensor measurement frame is in the $\hat{x}_b$-$\hat{y}_b$ plane; the magnetometer measurement axes are parallel to the axes of the projectile's body frame $F_b$; the magnetometer 110 is calibrated; the accelerometer measurement axis 121 is nominally aligned with the $\hat{x}_s$-axis.

The following assumptions regarding the projectile dynamics are made to enable dynamic analysis of the projectile: following launch, the projectile is in a free-fall trajectory subject to drag; the projectile is spin-stabilized along the minor axis with spin rate ≦300 Hz; the local Earth magnetic field (EMF) vector does not vary over the length and duration of the projectile trajectory and can be determined from geodetic survey data, computer models, or direct measurement; the gravity vector is aligned with the $\hat{z}_N$-axis. The processor 140 enables a low-cost, real-time attitude and heading angle reference system.

Since the vector matching algorithm 133 described herein includes these above mentioned assumptions, output from the vector matching algorithm 133 based on a simulation of an exemplary fast-spinning projectile in flight is shown in FIGS. 4-8. The simulation provides a check for the performance of the vector matching algorithm 133 in estimating the attitude and heading angle of the projectile 100.

The vector matching algorithm 133 described in the paper is applicable to fast spinning projectiles. However, in applications with slow-spinning projectiles, the sensor set can be augmented with an orthogonal triad of rate gyros and the vector matching algorithm 133 can be augmented with a Kalman filter, such as, Kalman filter 132 shown in FIG. 3, to estimate the 3D attitude of the slow-spinning projectile 100. The vector matching algorithm 133 can be augmented, first, by using the attitude estimator module 130 to design the measurement model of the Kalman filter 132 and, second, by selecting projectile dynamic models for the Kalman filter 132. These dynamic models can include the 3D attitude dynamic equations, the attitude kinematic equations, and gyro measurement models.

The equations of motion (e.g., the kinematic variables, dynamic variables, equations of motion, and accelerometer measurement equations) for a spinning projectile and the equations relating the accelerometer measurements to the projectile's kinematic and dynamic variables are now formulated.

The kinematic variables used to derive the dynamic equations of the projectile are now defined. The position vector of the projectile's center of mass resolved in the projectile's body frame is $$r^b = [l_x \quad l_y \quad l_z]^T \tag{2.1}$$

The position vector of the origin of the sensor measurement frame relative to the origin of the projectile's body frame resolved in the projectile's body frame is $$r_s^b = [r_x \quad r_y \quad r_z]^T \tag{2.2}$$

The angular velocity vector of the projectile, $\vec{\omega}$, resolved in the projectile's body frame is $$\omega^b = [\omega_x \quad \omega_y \quad \omega_z]^T \tag{2.3}$$

The attitude kinematic equations, parameterized using the direction cosine matrix, is written as $$\dot{C}_{bN} = -(\omega^b)^x C_{bN} \tag{2.4}$$

where $(\circ)^x$ refers to the skew-symmetric operator. The velocity vector of the origin of the sensor measurement frame, $\vec{v}_s$, is $$\vec{v}_s = \vec{v} + \vec{\omega} \times \vec{r}_s \tag{2.5}$$

where $\vec{v}$ refers to the velocity vector of the projectile's center of mass and where $$v_s^b = [v_{sx} \quad v_{sy} \quad v_{sz}]^T \tag{2.6}$$
$$v^b = [v_x \quad v_y \quad v_z]^T$$

The acceleration vector of the origin of the sensor measurement frame, $\vec{a}_s$ is $$\vec{a}_s = \dot{\vec{v}}_s|_b + \vec{\omega} \times \vec{v}_s \tag{2.7}$$

Equation (2.5) is substituted into equation (2.7), and $\vec{a}_s$ can be rewritten as $$\vec{a}_s = \dot{\vec{v}}|_b + \dot{\vec{\omega}}|_b \times \vec{r}_s + \vec{\omega} \times \vec{v} + \vec{\omega} \times (\vec{\omega} \times \vec{r}_s). \tag{2.8}$$

The sensor locations are fixed on the projectile. Equation (2.8) is resolved in the projectile's body frame as:

$$a_s^b = [\,a_{sx} \quad a_{sy} \quad a_{sz}\,]^T = \dot{v}^b + \dot{\omega}^{bx} r_s^b + \omega^{bx} v^b + \omega^{bx}\omega^{bx} r_s^b. \tag{2.9}$$

The accelerometer measurement axis vector, $\vec{r}_A$, resolved in the body frame is $$r_A^b = [\,1 \quad \varepsilon_y \quad \varepsilon_z]^T \tag{2.10}$$

where $\epsilon_y$, $\epsilon_z$ refer to the misalignment of the accelerometer measurement axes from the $\hat{x}_b$-axis.

The projectile's body frame is set as a principal axis frame, so the second (mass) moment of inertia of the projectile, $\vec{J}$, is written as $$J_b = \begin{bmatrix} J_x & 0 & 0 \\ 0 & J_y & 0 \\ 0 & 0 & J_z \end{bmatrix} \tag{2.11}$$

Since the projectile is spin stabilized about its minor axis it is assumed that $$J_y = J_z \geqq J_x \tag{2.12}$$

The dynamic equations of the projectile are now derived. The translational equations of motion of the projectile at the projectile's center of mass and at the origin of the sensor measurement frame are $$\frac{\vec{F}}{m_b} = \vec{a}_s = \dot{\vec{v}}\Big|_b + \dot{\vec{\omega}}\Big|_b \times \vec{r}_s + \vec{\omega} \times \vec{v} + \vec{\omega} \times (\vec{\omega} \times \vec{r}_s) \qquad \frac{\vec{F}}{m_b} = \dot{\vec{v}}\,|_b + \vec{\omega} \times \vec{v} \tag{2.13}$$

where $\vec{F}$ refers to the external forces acting on the projectile, $m_b$ refers to the mass of the projectile, and $\vec{a}_s$ is defined in equation (2.8). The external forces acting on the projectile are $$\vec{F} = \vec{F}_g + \vec{F}_{aero} + \vec{F}_M + \vec{F}_d \tag{2.14}$$

where $\vec{F}_g$ refers to the gravity force vector, $\vec{F}_{aero}$ refers to the aerodynamic drag force vector, $\vec{F}_M$, refers to the Magnus force vector, and $\vec{F}_d$ refers to force vectors not included in the first three terms such as disturbance force vectors. Equation (2.14) is resolved in the projectile's body frame as $$F^b = [\,F_x \quad F_y \quad F_z\,]^T = F_g^b + F_{aero}^b + F_M^b + F_d^b \tag{2.15}$$

The gravity force vector, resolved in the projectile's body frame, is written as $$F_g^b = C_{bN} F_g^N = C_{bN} [\,0 \quad 0 \quad g_E]^T \tag{2.16}$$

where $$g_E = 9.81 \text{ m/s}^2 \tag{2.17}$$

The aerodynamic drag force vector, resolved in the projectile's body frame, is written as $$F_{aero}^b = -\frac{1}{2}\rho S \|\vec{v}\| (C_{D,xyz} v^b + \bar{c}\, C_{\omega,xyz} \omega^b) \tag{2.18}$$

where ρ refers to the air density, S refers to the cross-sectional area of the projectile, $\bar{c}$ projectile chord length (typically the projectile's diameter), and $C_{D,xyz}$,$C_{\omega,xyz}$ refer to 3×3 matrices of aerodynamic force coefficients. The matrices of aerodynamic force coefficients are written as follows $$C_{D,xyz} = \begin{bmatrix} C_{D0} & 0 & 0 \\ 0 & C_{L\alpha} & 0 \\ 0 & 0 & C_{L\alpha} \end{bmatrix} \qquad C_{\omega,xyz} = 0 \tag{2.19}$$

where $C_{D0}$ refers to the projectile's drag coefficient at angle of attack and $C_{L\alpha}$ refers to the projectile's side force drag coefficient. The projectile's side force drag coefficient is set equal to the projectile's normal force coefficient, since it is assumed that that the projectile's cross-sectional area is circular. The projectile's angle of attack is α and the projectile's sideslip angle is β. The angles α and β are related to the projectile's velocity vector using the following two assumptions 1) $\|\vec{v}\| \approx v_x$ and 2) α and β are expressed using small angle assumptions. Then α, β and $\vec{v}$ are written as $$\alpha \approx \frac{v_z}{v_x} \qquad \beta \approx \frac{v_y}{v_x} \qquad \frac{v^b}{\|\vec{v}\|} \approx [\,1 \quad \beta \quad \alpha\,]^T. \tag{2.20}$$

Equations (2.19) and (2.20) are substituted into equation (2.18), and the aerodynamic drag force vector is rewritten as $$F_{aero}^b = -\frac{1}{2}\rho S \|\vec{v}\|^2 \begin{bmatrix} C_{D0} \\ C_{L\alpha}\beta \\ C_{L\alpha}\alpha \end{bmatrix}. \tag{2.21}$$

Since α and β are assumed to be small angles $\alpha^2$, $\beta^2 \approx 0$. The gravity force vector and aerodynamic drag force vector are assumed to be the only external force vectors acting on the projectile so that $$\vec{F}_M = 0 \qquad \vec{F}_d = 0. \tag{2.22}$$

The rotational equations of motion of the projectile about its center of mass are $$\vec{G}=\vec{\mathcal{J}}\cdot\dot{\vec{\omega}}|_b+\vec{\omega}\times(\vec{\mathcal{J}}\cdot\vec{\omega}) \tag{2.23}$$

where $\vec{G}$ refers to the external torques acting on the projectile's center of mass. Equation (2.23) is resolved in the projectile's body frame, so $$\dot{\omega}^b=J_b^{-1}G^b-J_b^{-1}\omega^{bx}J_b\omega^b \tag{2.24}$$

The external torques acting on the projectile's center of mass are $$\vec{G}=\vec{r}_p\times\vec{F}_{aero}+\vec{r}_M\times\vec{F}_M+\vec{G}_{aero}+\vec{G}_d \tag{2.25}$$

where $\vec{r}_p$ refers to the position vector of the projectile's center of pressure relative to the projectile's center of mass, $\vec{r}_M$ refers to the position vector of the projectile's center of Magnus force relative to the projectile's center of mass, $\vec{G}_{aero}$ refers to the aerodynamic torque vector, and refers to torque vectors not included in the first three terms such as disturbance torque vectors. Equation (2.25) is resolved in the projectile's body frame, so $$\begin{aligned} G^b &= [\,G_x \quad G_y \quad G_z\,]^T \\ &= r_p^{bx}F_{aero}^b + r_M^{bx}F_M^b + G_{aero}^b + G_d^b. \end{aligned} \tag{2.26}$$

The projectile's center of pressure is assumed to lie along the projectile's $\hat{x}_b$-axis so that $$r_p^b=[\,r_{px} \quad 0 \quad 0]^T. \tag{2.27}$$

The torque acting on the projectile's center of mass due to the aerodynamic drag force vector, resolved in the projectile's body frame, is written by substituting equations (2.21) and (2.27) into equation (2.26)

$$\begin{aligned} r_p^{b\times}F_{aero}^b &= -\frac{1}{2}\rho S\|\vec{v}\|^2\begin{bmatrix} r_{px} \\ 0 \\ 0 \end{bmatrix}^{\times}\begin{bmatrix} C_{D0} \\ C_{L\alpha}\beta \\ C_{L\alpha}\alpha \end{bmatrix} \\ &= -\frac{1}{2}\rho S\|\vec{v}\|^2\begin{bmatrix} 0 \\ -r_{px}C_{L\alpha}\alpha \\ r_{px}C_{L\alpha}\beta \end{bmatrix} \end{aligned} \tag{2.28}$$

The torque acting on the projectile's center of mass due to the gravity force vector is assumed to be the only external torque vector acting on the projectile's center of mass so that $$\begin{aligned} \vec{r}\times\vec{F}_M &= \vec{0} \\ \vec{G}_{aero} &= \vec{0} \\ \vec{G}_d &= \vec{0} \end{aligned} \tag{2.29}$$

The equations relating the accelerometer measurements to the projectile's kinematic and dynamic variables are now derived. Specifically, the projectile's acceleration and external force components measured by the single axis accelerometer aligned with the sensor's $\hat{x}_s$-axis are derived. In general, $$\vec{f}_s=\vec{a}_s-\frac{\vec{F}_g}{m_b} \tag{2.30}$$

where $\vec{f}_s$ refers to the accelerometer measurements. Equation (2.8) is substituted into equation (2.30), and $\vec{f}_s$ is rewritten as $$\vec{f}_s=\dot{\vec{v}}\Big|_b+\dot{\vec{\omega}}\Big|_b\times\vec{r}_s+\vec{\omega}\times\vec{v}+\vec{\omega}\times(\vec{\omega}\times\vec{r}_s)-\frac{\vec{F}_g}{m_b}. \tag{2.31}$$

By appealing to the vector identity $$\vec{u}\times(\vec{v}\times\vec{w})=(\vec{u}\cdot\vec{w})\vec{v}-(\vec{w}\,\vec{u})\vec{v}, \tag{2.32}$$

equation (2.31) is rewritten as $$\vec{f}_s=\dot{\vec{v}}\Big|_b+\dot{\vec{\omega}}\Big|_b\times\vec{r}_s+\vec{\omega}\times\vec{v}-(\vec{\omega}\cdot\vec{\omega}\vec{I}-\vec{\omega}\,\vec{\omega})\vec{r}_s-\frac{\vec{F}_g}{m_b} \tag{2.33}$$

$$\vec{f}_s=\dot{\vec{v}}\Big|_b+\dot{\vec{\omega}}\Big|_b\times\vec{r}_s+\vec{\omega}\times\vec{v}+\vec{\omega}\times(\vec{\omega}\times\vec{r}_s)-\frac{\vec{F}_g}{m_b}. \tag{2.31}$$

By appealing to the vector identity $$\vec{u}\times(\vec{v}\times\vec{w})=(\vec{u}\cdot\vec{w})\vec{v}-(\vec{w}\,\vec{u})\vec{v}, \tag{2.32}$$

equation (2.31) is rewritten as $$\vec{f}_s=\dot{\vec{v}}\Big|_b+\dot{\vec{\omega}}\Big|_b\times\vec{r}_s+\vec{\omega}\times\vec{v}-(\vec{\omega}\cdot\vec{\omega}\vec{I}-\vec{\omega}\,\vec{\omega})\vec{r}_s-\frac{\vec{F}_g}{m_b}. \tag{2.33}$$

Equation (2.33) indicates that $\vec{f}_s$ is a function of the body derivatives of the velocity vector and angular velocity vector. Substituting these derivative vector terms using the kinematic and dynamic equations developed above, $\vec{f}_s$ is written as a function of the velocity vector and the angular velocity vector. Therefore, the accelerometer measurements are functions of the projectile's velocity and angular velocity.

By substituting equations (2.7), (2.13), (2.14), and (2.22) into equation (2.33), then $\vec{f}_s$ is rewritten as $$\begin{aligned} \vec{f}_s &= \left(\frac{\vec{F}_g+\vec{F}_{aero}+\vec{F}_M+\vec{F}_d}{m_b}-\vec{\omega}\times\vec{v}\right)+\dot{\vec{\omega}}\Bigg|_b\times \\ &\quad \vec{r}_s+\vec{\omega}\times\vec{v}-(\vec{\omega}\cdot\vec{\omega}\vec{I}-\vec{\omega}\,\vec{\omega})\vec{r}_s-\frac{\vec{F}_g}{m_b} \\ &= \frac{\vec{F}_{aero}}{m_b}+\dot{\vec{\omega}}\Bigg|_b\times\vec{r}_s-(\vec{\omega}\cdot\vec{\omega}\vec{I}-\vec{\omega}\,\vec{\omega})\vec{r}_s. \end{aligned} \tag{2.34}$$

Equation (2.34) indicates that the projectile's velocity vector affects the accelerometer measurements through the aerodynamic drag force vector. Equation (2.34) is resolved in the projectile's body frame, so that:

$$f_s^b=\frac{F^b_{aero}}{m_b}+\dot{\omega}_b^{b\times}r_s^b-(\omega_b^{bT}\omega_b^bI-\omega_b^b\omega_b^{bT})r_s^b. \tag{2.35}$$

Substituting equation (2.24) into equation (2.35), allows $\vec{f}_s$ to be rewritten as:

$$\begin{aligned}f_s^b&=\frac{F^b_{aero}}{m_b}+(J_b^{-1}G^b-J_b^{-1}\omega^{b\times}J_b\omega^b)^\times r_s^b-\\&\quad(\omega_b^{bT}\omega_b^bI-\omega_b^b\omega_b^{bT})r_s^b\\&=\frac{F^b_{aero}}{m_b}+((J_b^{-1}G^b-J_b^{-1}\omega^{b\times}J_b\omega^b)^\times-\omega_b^{bT}\omega_b^bI+\omega_b^b\omega_b^{bT})r_s^b.\end{aligned} \tag{2.36}$$

The single axis accelerometer is aligned with the projectile's $\hat{x}_b$-axis. However, accelerometer misalignment with the projectile's $\hat{x}_b$-axis introduces the projectile's spin rate components into the accelerometer measurements, equation (2.10). In its scalar component form as resolved in $F_b$, the single axis accelerometer aligned with the projectile's $\hat{x}_b$-axis measures the following aerodynamic drag force and angular velocity components.

$$\begin{aligned}f_s^b&=\frac{\rho S\|\vec{v}\|^2C_{D0}}{2m_b}+\begin{bmatrix}1\\\varepsilon_y\\\varepsilon_z\end{bmatrix}^T\begin{bmatrix}J_x^{-1}(G_x-\omega_y\omega_z(J_z-J_y))\\J_y^{-1}(G_y-\omega_x\omega_z(J_x-J_z))\\J_z^{-1}(G_z-\omega_x\omega_y(J_y-J_x))\end{bmatrix}^\times\begin{bmatrix}r_x\\r_y\\r_z\end{bmatrix}+\\&\quad\begin{bmatrix}1\\\varepsilon_y\\\varepsilon_z\end{bmatrix}^T\begin{bmatrix}-\omega_y^2-\omega_z^2&\omega_x\omega_y&\omega_x\omega_z\\\omega_x\omega_y&-\omega_x^2-\omega_z^2&\omega_y\omega_z\\\omega_x\omega_z&\omega_y\omega_z&-\omega_x^2-\omega_y^2\end{bmatrix}\begin{bmatrix}r_x\\r_y\\r_z\end{bmatrix}\\&=\frac{\rho S\|\vec{v}\|^2C_{D0}}{2m_b}+\begin{bmatrix}1\\\varepsilon_y\\\varepsilon_z\end{bmatrix}^T\\&\quad\begin{bmatrix}-J_z^{-1}(G_z-\omega_x\omega_y(J_y-J_x))r_y+J_y^{-1}(G_y-\omega_x\omega_z(J_x-J_z))r_z\\J_z^{-1}(G_z-\omega_x\omega_y(J_y-J_x))r_x-J_x^{-1}(G_x-\omega_y\omega_z(J_z-J_y))r_z\\-J_y^{-1}(G_y-\omega_x\omega_z(J_x-J_z))r_x+J_x^{-1}(G_x-\omega_y\omega_z(J_z-J_y))r_y\end{bmatrix}+\\&\quad\begin{bmatrix}1\\\varepsilon_y\\\varepsilon_z\end{bmatrix}^T\begin{bmatrix}(-\omega_y^2-\omega_z^2)r_x+\omega_x\omega_yr_y+\omega_x\omega_zr_z\\\omega_x\omega_yr_x+(-\omega_x^2-\omega_z^2)r_y+\omega_y\omega_zr_z\\\omega_x\omega_zr_x+\omega_y\omega_zr_y+(-\omega_x^2-\omega_y^2)r_z\end{bmatrix}\\f_{sx}^b&=-\frac{\rho S\|\vec{v}\|^2C_{D0}}{2m_b}-J_z^{-1}(G_z-\omega_x\omega_y(J_y-J_x))r_y+\\&\quad J_y^{-1}(G_y-\omega_x\omega_z(J_x-J_z))r_z+\varepsilon_y(J_z^{-1}(G_z-\omega_x\omega_y(J_y-J_x))r_x-\\&\quad J_x^{-1}(G_x-\omega_y\omega_z(J_z-J_y))r_z)+\\&\quad\varepsilon_z(-J_y^{-1}(G_y-\omega_x\omega_z(J_x-J_z))r_x+\\&\quad J_x^{-1}(G_x-\omega_y\omega_z(J_z-J_y))r_y)+(-\omega_y^2-\omega_z^2)r_x+\omega_x\omega_yr_y+\\&\quad\omega_x\omega_zr_z+\varepsilon_y(\omega_x\omega_yr_x+(-\omega_x^2-\omega_z^2)r_y+\omega_y\omega_zr_z)+\\&\quad\varepsilon_z(\omega_x\omega_zr_x+\omega_y\omega_zr_y+(-\omega_x^2-\omega_y^2)r_z)\end{aligned} \tag{2.38}$$

Equations (2.12) and (2.28) are substituted into equation (2.38), so $$\begin{aligned}f_{sx}^b&\approx-\frac{\rho S\|\vec{v}\|^2C_{D0}}{2m_b}+\frac{\rho S\|\vec{v}\|^2r_{px}C_{L\alpha}\beta}{2J_z}r_y+\end{aligned} \tag{2.39}$$

-continued $$\begin{aligned}&\frac{\omega_x\omega_y(J_y-J_x)}{J_z}r_y+\frac{\rho S\|\vec{v}\|^2r_{px}C_{L\alpha}\alpha}{2J_y}r_z-\\&\frac{\omega_x\omega_z(J_x-J_z)}{J_y}r_z+(-\omega_y^2-\omega_z^2)r_x+\omega_x\omega_yr_y+\\&\omega_x\omega_zr_z+\varepsilon_y\left(\frac{G_z}{J_z}r_x-\frac{\omega_x\omega_y(J_y-J_x)}{J_z}r_x+\right.\\&\left.\omega_x\omega_yr_x+(-\omega_x^2-\omega_z^2)r_y+\omega_y\omega_zr_z\right)+\\&\varepsilon_z\left(\frac{G_y}{J_y}r_x+\frac{\omega_x\omega_z(J_x-J_z)}{J_y}r_x+\right.\\&\left.\omega_x\omega_zr_x+\omega_y\omega_zr_y+(-\omega_x^2-\omega_y^2)r_z\right).\end{aligned}$$

The projectile is assumed to be spin stabilized about its minor axis so equation (2.12) is satisfied, and $$\begin{aligned}\omega_x^2r_y&>>\frac{G_z}{J_z}r_x-\frac{\omega_x\omega_y(J_y-J_x)}{J_z}r_x+\omega_x\omega_yr_x-\omega_z^2r_y+\omega_y\omega_zr_z\\\omega_x^2r_z&>>-\frac{G_y}{J_y}r_x+\frac{\omega_x\omega_z(J_x-J_z)}{J_y}r_x+\\&\qquad\omega_x\omega_zr_x+\omega_y\omega_zr_y+\omega_y^2r_z\frac{J_y-J_x}{J_z}=\frac{J_z-J_x}{J_y}\approx1.\end{aligned} \tag{2.40}$$

Equation (2.40) is substituted into equation (2.39), so $$\begin{aligned}f_{sx}^b&\approx-\frac{\rho S\|\vec{v}\|^2C_{D0}}{2m_b}+\frac{\rho S\|\vec{v}\|^2r_{px}C_{L\alpha}}{2J_z}(\beta r_y+\alpha r_z)-\\&\qquad(\omega_y^2+\omega_z^2)r_x+2\omega_x(\omega_yr_y+\omega_zr_z)-\omega_x^2(\varepsilon_yr_y+\varepsilon_zr_z).\end{aligned} \tag{2.41}$$

Equation (2.41) indicates that the accelerometer measurements include both low-frequency components and high-frequency components. The accelerometer measurements are low- and high-pass filtered, so $$\begin{aligned}\text{low-pass}(f_{sx}^b)&\approx-\frac{\rho S\|\vec{v}\|^2C_{D0}}{2m_b}-(\omega_y^2+\omega_z^2)r_x-\\&\qquad\omega_x^2(\varepsilon_yr_y+\varepsilon_zr_z)\\\text{high-pass}(f_{sx}^b)&\approx\frac{\rho S\|\vec{v}\|^2r_{px}C_{L\alpha}}{2J_z}(\beta r_y+\alpha r_z)+\\&\qquad2\omega_x(\omega_yr_y+\omega_zr_z).\end{aligned} \tag{2.42}$$

The side force drag coefficient is assumed to be 0, so $$C_{L\alpha}=0. \tag{2.43}$$

Then equation (2.42) is rewritten as $$\begin{aligned}\text{low-pass}(f_{sx}^b)&\approx-\frac{\rho S\|\vec{v}\|^2C_{D0}}{2m_b}-\\&\qquad(\omega_y^2+\omega_z^2)r_x-\omega_x^2(\varepsilon_yr_y+\varepsilon_zr_z)\\&\approx-\frac{\rho S\|\vec{v}\|^2C_{D0}}{2m_b}-(\omega_y^2+\omega_z^2)r_x\\high\text{-pass}(f_{sx}^b)&\approx2\omega_x(\omega_yr_y+\omega_zr_z).\end{aligned} \tag{2.44}$$

The term $\omega_x^2(\epsilon_yr_y+\epsilon_zr_z)$ is an error component due to accelerometer mounting misalignment within the projectile.

Figure 4:
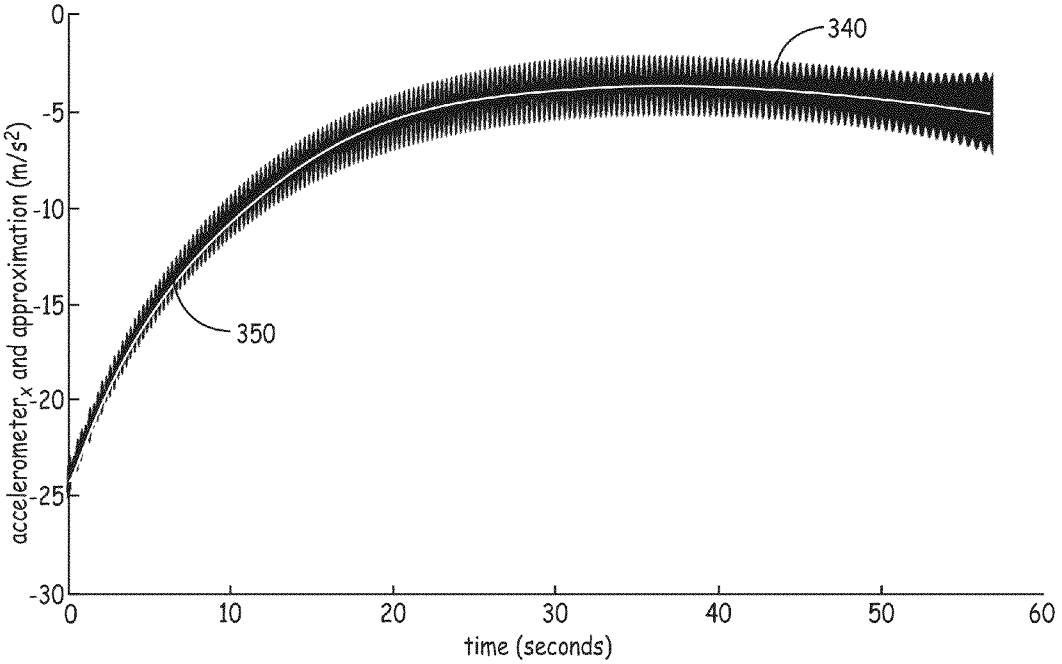
FIG. 4 shows the plots of the true accelerometer measurements and the low-pass filtered accelerometer measurements for a 155 mm projectile, spin stabilized about its minor axis with a spin rate of 100 Hz.

Since a number of assumptions and simplifications were used to derive equations (2.41) and (2.44), a verification process is described. The true accelerometer measurements and the filtered accelerometer components are plotted to verify that the filtered components capture the dynamics of the true accelerometer measurements. FIG. 4 shows the plots of the true accelerometer measurements 340 and the low-pass filtered accelerometer measurements 350 (Equation 2.44) for a 155 mm projectile, spin stabilized about its minor axis with a spin rate of 100 Hz. As is shown in FIG. 4, the low-pass filtered component of the accelerometer measurements 350 are dominated by the aerodynamic drag force.

The vector matching algorithm 133 for the attitude estimator module 130 in the apparatus 10 or 11 is now derived. As described above, the first objective of this report is to design an attitude and heading angle reference system for a fast spinning projectile using Wahba's problem, or vector matching. This objective can be restated as computing the attitude and heading angle of a fast spinning projectile using vector matching. This computation is done based on the measurements from the three-axis magnetometer 110 and the single axis accelerometer 120 aligned with the projectile's spin axis $X_p$. The solution of Wahba's problem, equation (1.1), is $$C_{bN}\left[\frac{v^N}{\|v^N\|}\ \frac{m^N}{\|m^N\|}\ \frac{v^{N\times}}{\|v^N\|}\frac{m^N}{\|m^N\|}\right]=\left[\frac{v^b}{\|v^b\|}\ \frac{m^b}{\|m^b\|}\ \frac{v^{b\times}}{\|v^b\|}\frac{m^b}{\|m^b\|}\right] \tag{3.1}$$

$$C_{bN}=\left[\frac{v^b}{\|v^b\|}\ \frac{m^b}{\|m^b\|}\ \frac{v^{b\times}}{\|v^b\|}\frac{m^b}{\|m^b\|}\right]\left[\frac{v^N}{\|v^N\|}\ \frac{m^N}{\|m^N\|}\ \frac{v^{N\times}}{\|v^N\|}\frac{m^N}{\|m^N\|}\right]^{-1}$$

$$[U,\Sigma,V]=svd(C_{bN})$$

$$C_{bN\_final}=UV^{-1}.$$

The term svd shown in equation 3.1 is referred to herein as a singular value decomposition that is used to calculate generate a direction cosine matrix $C_{bN\_final}$ from the direction cosine matrix $C_{bN}$ calculated to solve Wahba's problem in order to enforce orthogonality constraints on the direction cosine matrix $C_{bN}$ calculated to solve Wahba's problem. The projectile's attitude and heading angle are computed from $C_{bN\_final}$. Equation (3.1) requires the following information to compute $C_{bN\_final}$: 1) the magnitude and direction of the local Earth magnetic field vector in the projectile's body frame; 2) the magnitude and direction of the local Earth magnetic field vector in the NED frame; 3) the magnitude and direction of the projectile's velocity vector in the projectile's body frame; and 4) the magnitude and direction of the projectile's velocity vector in the NED frame.

The methodology required to use the local Earth magnetic field vector in the vector matching algorithm 133 is now described. The vector matching algorithm 133 requires the components of the local Earth magnetic field vector resolved in both the projectile's body frame and the NED frame. The measurements from the three-axis magnetometer 110 provide the components of the local Earth magnetic field vector resolved in the projectile's body frame because the axes of the sensor measurement frame are aligned with the axes of the projectile's body frame. The magnetometer measurements are assumed to be calibrated.

The vector matching algorithm 133 requires the magnitude and direction of the projectile's velocity vector in the NED frame and the projectile's body frame. The methodology required to compute the magnitude of the projectile's velocity vector, the direction of the projectile's velocity vector in the NED frame, and the direction of the projectile's velocity vector in the projectile's body frame is now described.

The magnitude of the projectile's velocity vector is determined from the accelerometer measurement equation, equation (2.41). FIG. 4 shows that the low-pass filtered accelerometer measurements are governed by the aerodynamic drag force vector. Therefore, the low-pass filtered accelerometer measurements are rewritten as $$\text{low-pass}(f_{sx}^b(t))\approx-\frac{\rho S\|\vec{v}(t)\|^2C_{D0}}{2m_b} \tag{3.2}$$

Equation (3.2) is rearranged as:

$$\|\hat{\vec{v}}(t)\|=\sqrt{-\frac{2m_b\,\text{low-pass}(f_{sx}^b(t))}{\rho SC_{D0}}} \tag{3.3}$$

where $\|\hat{\vec{v}}\|$ refers to the magnitude of the projectile's velocity vector computed by low-pass filtering the accelerometer measurements. Equation (3.3) indicates that the aerodynamic drag force vector is the key component of the accelerometer measurements used to estimate the magnitude of the projectile's velocity vector.

Figure 5:
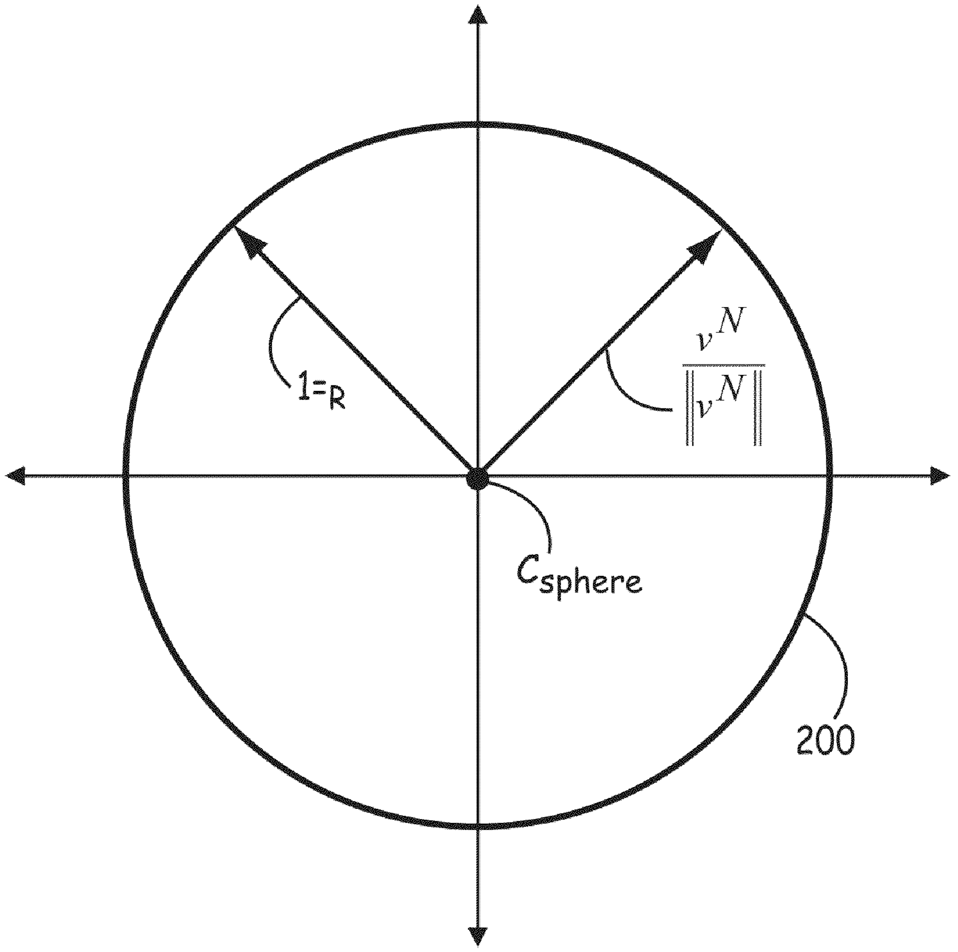
FIG. 5 shows an exemplary unit velocity vector on the unit sphere for a projectile in accordance with the present invention.

The direction of the projectile's velocity vector in the projectile's NED frame is determined. FIG. 5 shows an exemplary unit velocity vector on the unit sphere 200 for a projectile 100 in accordance with the present invention. The tip of the unit velocity vector $$\frac{v^N}{\|v^N\|}$$

is constrained to lie on the surface of an exemplary unit sphere 200 so that:

$$\frac{v^N}{\|v^N\|}\cdot\frac{v^N}{\|v^N\|}=1. \tag{3.4}$$

Figure 6:
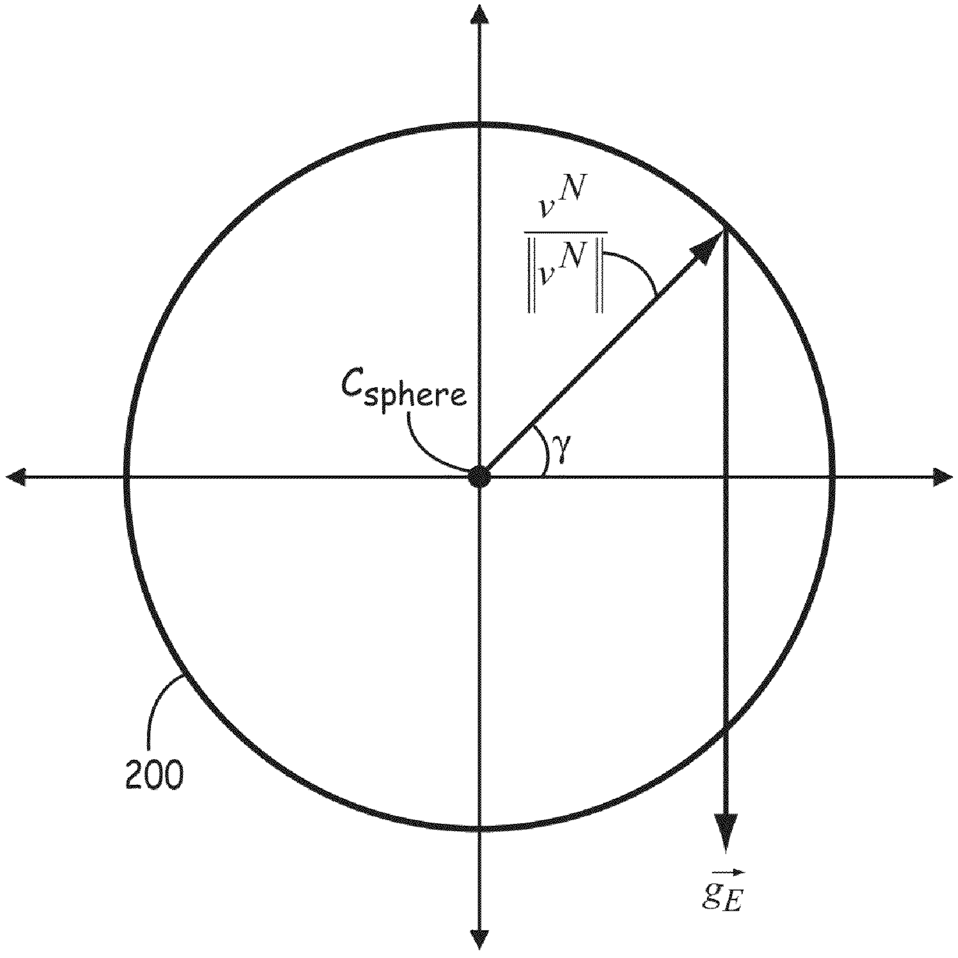
FIG. 6 shows a flight path angle for an exemplary projectile in accordance with the present invention.

FIG. 6 shows a flight path angle for an exemplary projectile in accordance with the present invention. The tip of the unit vector $$\frac{v^N}{\|v^N\|}$$

is constrained to lie in the plane defined by the projectile's flight path angle, γ.

$$\begin{aligned}\frac{g^N}{\|g^N\|}\cdot\left(-\frac{v^N}{\|v^N\|}\right)&=\cos(90^\circ-\gamma)\\&=\sin\gamma\end{aligned} \tag{3.5}$$

$$\frac{g^N}{\|g^N\|}\cdot\frac{v^N}{\|v^N\|}=-\sin\gamma.$$

The plane defined by γ and the unit sphere 200 intersect in a circle. Therefore, the projectile's flight path angle constrains the tip of the unit vector $$\frac{v^N}{\|v^N\|}$$

to lie on the intersection of the plane at vertical distance sin γ from the center $C_{sphere}$ of the unit sphere 200 and the sphere 200. The projectile's flight path angle γ is computed from the accelerometer measurements. The governing equation for flight path angle is $$\dot{\hat{\gamma}}(t) = -\frac{g_E \cos\hat{\gamma}(t)}{\|\hat{\vec{v}}(t)\|} \tag{3.6}$$

$\gamma(0) \equiv$ projectile launch angle.

Equation 2.17 defines $g_E$. $\|\hat{\vec{v}}\|$ is determined from the low-pass filtered accelerometer measurements, and γ(0) is determined from accelerometer measurements just prior to projectile launch.

Figure 7:
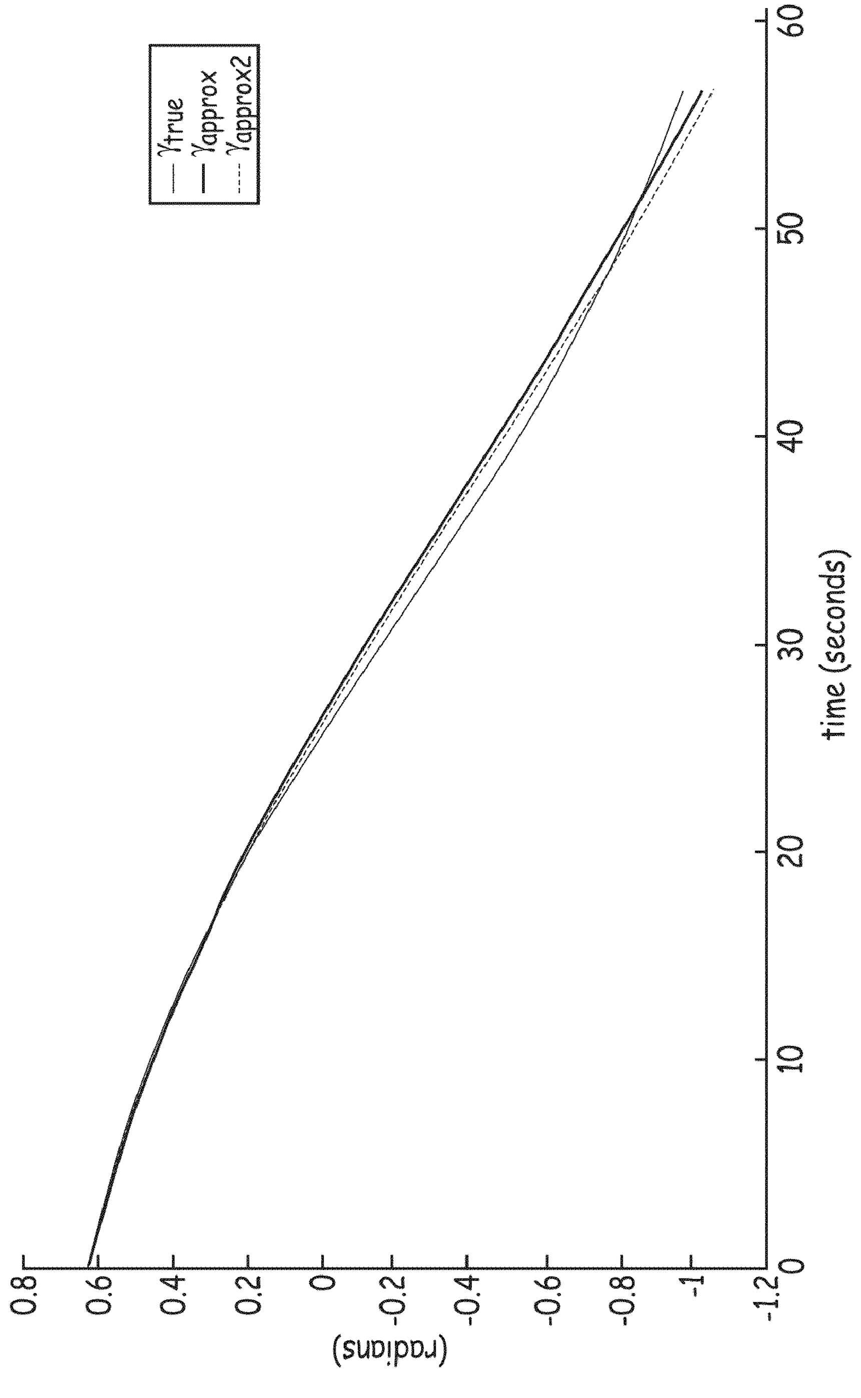
FIG. 7 shows the plots of the true flight path angle and estimated flight path angle for an exemplary 155 mm projectile, spin stabilized about its minor axis with a spin rate of 100 Hz.

Since a number of assumptions and simplifications were made in order to derive $\|\hat{\vec{v}}\|$ in equation (3.6) the projectile's true flight path angle and estimated flight path angle are plotted to verify that the projectile's estimated speed captures the dynamics of the projectile's true speed. FIG. 7 shows the plots of the true flight path angle and estimated flight path angle for a 155 mm projectile, spin stabilized about its minor axis with a spin rate of 100 Hz. A $4^{th}$-order low-pass filter was used to estimate the projectile's speed from the aerodynamic drag force component of the accelerometer measurements $$\text{low-pass}(f_{sx}^b(t)) = \frac{40^4}{(s+40)^4} f_{sx}^b(t). \tag{3.7}$$

The plots in FIG. 7 indicate that during ascent of the projectile 100 sin γ>0 and during the descent of the projectile 100 the sin γ<0.

The tip of the unit vector $$\frac{v^N}{\|v^N\|}$$

is constrained to lie in the plane defined by the local Earth magnetic field vector. The projectile's velocity vector resolved in the projectile's body frame is assumed to be in the same direction as the projectile's angular velocity vector resolved in the projectile's body frame, so $$\frac{v^N}{\|v^N\|} \cdot \frac{m^N}{\|m^N\|} = \frac{v^b}{\|v^b\|} \cdot \frac{m^b}{\|m^b\|} \approx \frac{m^b}{\|m^b\|} \cdot \frac{\omega^b}{\|\omega^b\|} \approx \frac{m_x}{\|m^b\|} \tag{3.8}$$

where $$m^b = [m_x \quad m_y \quad m_z]^T. \tag{3.9}$$

The dot product operator is independent of reference frame. Equations (3.5) and (3.8) are combined, so $$\begin{bmatrix} \frac{g^{NT}}{\|g^N\|} \\ \frac{m^{NT}}{\|m^N\|} \end{bmatrix} \frac{v^N}{\|v^N\|} = \begin{bmatrix} -\sin\gamma \\ \frac{m_x}{\|m^b\|} \end{bmatrix} \tag{3.10}$$

The tip of the unit vector $$\frac{v^N}{\|v^N\|}$$

must lie on the unit sphere and the two planes defined by equation (3.10). The intersection of two planes is a line. In general, a line intersects a sphere at either two points, 1 point, or no points. In this case, the line defined by equation (3.10) intersects the unit sphere at two points. The two points indicate the possible directions of the projectile's velocity vector resolved in the projectile's inertial frame. One of the two points is selected based on the projectile's launch direction (East or West) relative to the direction of the local Earth magnetic field vector. The two possible directions of the unit vector $$\frac{v^N}{\|v^N\|}$$

are determined, first, by computing the equation of the line defined by equation (3.10) and, second, by computing the intersection points of the line with the unit sphere.

The equation of a line is written as $$A(v_{po\ int} + v_{par}) = y \tag{3.11}$$

where $$A = \begin{bmatrix} \frac{g^N}{\|g^N\|} & \frac{m^N}{\|m^N\|} \end{bmatrix}^T \tag{3.12}$$

$$y = \begin{bmatrix} -\sin\gamma \\ \frac{m_x}{\|m^b\|} \end{bmatrix}$$

$$\frac{v^N}{\|v^N\|} = v_{point} + v_{par}.$$

and where $v_{po\ int} \in R(A)$ the homogeneous solution and $v_{par} \in N(A)$ refers to the particular solution. The homogeneous solution $v_{po\ int}$ is determined directly from equation (3.11)

$$v_{po\ int} = A^T(AA^T)^{-1}y. \tag{3.13}$$

The matrix $AA^T$ is $$AA^T = \begin{bmatrix} \frac{g^N}{\|g^N\|} & \frac{m^N}{\|m^N\|} \end{bmatrix}^T \begin{bmatrix} \frac{g^N}{\|g^N\|} & \frac{m^N}{\|m^N\|} \end{bmatrix} \tag{3.14}$$

-continued $$= \begin{bmatrix} 1 & \frac{g^{NT}}{\|g^N\|}\frac{m^N}{\|m^N\|} \\ \frac{m^{NT}}{\|m^N\|}\frac{g^N}{\|g^N\|} & 1 \end{bmatrix}.$$

The determinant of $AA^T$ is $$\det(AA^T) = 1 - \left(\frac{g^{NT}}{\|g^N\|}\frac{m^N}{\|m^N\|}\right)^2 = 1 - \left(\frac{g^N}{\|g^N\|}\cdot\frac{m^N}{\|m^N\|}\right)^2. \tag{3.15}$$

The angle α is defined as the angle between $\vec{g}$ and $\vec{m}$ resolved in the projectile's body frame, so $$\det(AA^T) = 1 - \cos^2\alpha = \sin^2\alpha = \left\|\frac{g^N}{\|g^N\|}\times\frac{m^N}{\|m^N\|}\right\|^2 = \|\vec{b}\|^2. \tag{3.16}$$

The inverse of $AA^T$ is $$(AA^T)^{-1} = \frac{1}{\det(AA^T)}\mathrm{cov}(AA^T) = \frac{1}{\|\vec{b}\|^2}\begin{bmatrix} 1 & -\frac{m^{NT}}{\|m^N\|}\frac{g^N}{\|g^N\|} \\ -\frac{g^{NT}}{\|g^N\|}\frac{m^N}{\|m^N\|} & 1 \end{bmatrix}. \tag{3.17}$$

Equations (3.12) and (3.17) are substituted into equation (3.13), so $$v_{point} = \frac{1}{\|\vec{b}\|^2}\begin{bmatrix} \frac{g^N}{\|g^N\|} & \frac{m^N}{\|m^N\|} \end{bmatrix}\begin{bmatrix} 1 & -\frac{m^{NT}}{\|m^N\|}\frac{g^N}{\|g^N\|} \\ -\frac{g^{NT}}{\|g^N\|}\frac{m^N}{\|m^N\|} & 1 \end{bmatrix}\begin{bmatrix} -\sin\gamma \\ \frac{m_x}{\|m^b\|} \end{bmatrix} = \frac{1}{\|\vec{b}\|^2}\begin{bmatrix} \frac{g^N}{\|g^N\|} - \frac{g^{NT}}{\|g^N\|}\frac{m^N}{\|m^N\|}\frac{m^N}{\|m^N\|} - \frac{m^{NT}}{\|m^N\|}\frac{g^N}{\|g^N\|}\frac{g^N}{\|g^N\|} + \frac{m^N}{\|m^N\|} \end{bmatrix}\begin{bmatrix} -\sin\gamma \\ \frac{m_x}{\|m^b\|} \end{bmatrix}. \tag{3.18}$$

The particular solution $v_{par}$ is determined by noting that the cross-product $\vec{b}$, defined in equation (3.16), is perpendicular to both unit vectors $$\frac{g^N}{\|g^N\|}$$

and $$\frac{m^N}{\|m^N\|}.$$

Therefore, $\vec{b}\in N(A)$ and the unit vector $$\frac{v^N}{\|v^N\|}$$

are written as $$\frac{v^N}{\|v^N\|} = v_{point} + \xi b^N, \tag{3.19}$$

where $\xi\in\mathfrak{R}$. The scalar ξ is determined where the line defined by equation (3.10) intersects the unit sphere $$\frac{v^N}{\|v^N\|}\cdot\frac{v^N}{\|v^N\|} = 1 = (v_{point} + \xi b^N)^T(v_{point} + \xi b^N) = \|v_{point}\|^2 + \xi^2\|b^N\|^2 \qquad \xi^2 = \frac{1 - \|v_{point}\|^2}{\|b^N\|^2}, \tag{3.20}$$

where $v_{po\ int}^T b^N = 0$. Equation (3.20) is substituted into equation (3.19), then $$\frac{v^N}{\|v^N\|} = v_{point} \pm \sqrt{1 - \|v_{point}\|^2}\,\frac{b^N}{\|b^N\|^2}. \tag{3.21}$$

Figure 8:
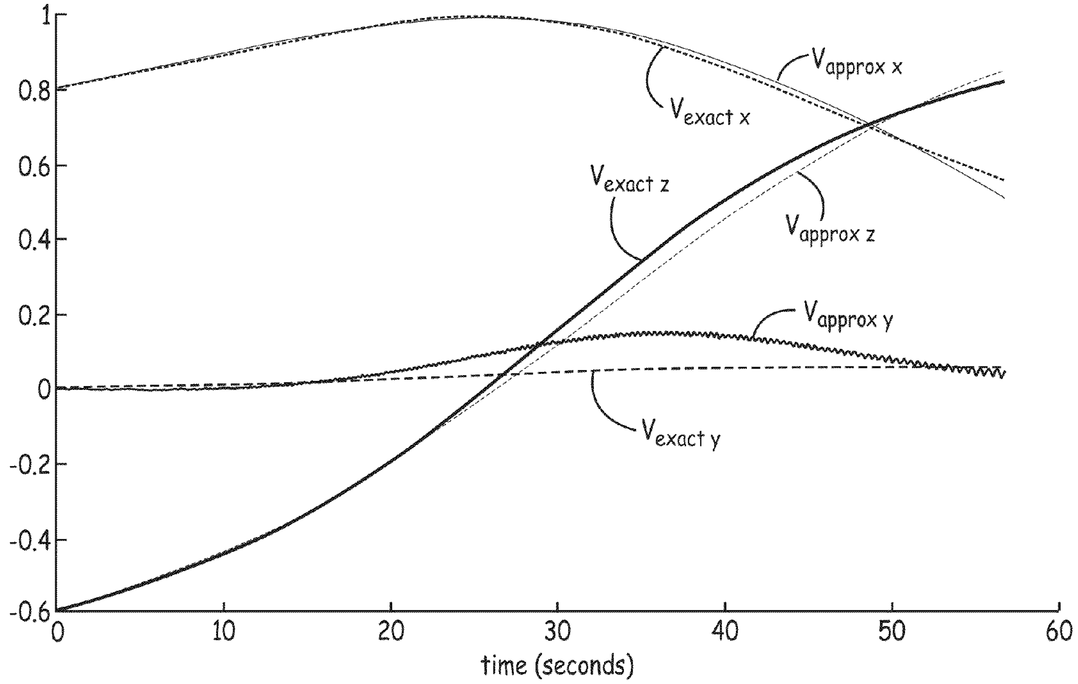
FIG. 8 shows the plots of the scalar components of the true velocity vector and an estimated velocity vector resolved in the projectile's North East Down frame for a 155 nm projectile, spin stabilized about its minor axis with a spin rate of 100 Hz.

Since a number of assumptions and simplifications have been made to derive the magnitude and direction of the projectile's velocity vector resolved in the projectile's NED frame verification is now demonstrated. The components of projectile's true velocity vector and estimated velocity vector resolved in the projectile's navigation frame are plotted to verify that the projectile's estimated velocity vector captures the dynamics of the projectile's true velocity vector. FIG. 8 shows the plots of the scalar components of the true velocity vector ($V_{exact\,x}$, $V_{exact\,y}$, $V_{exact\,z}$) and estimated velocity vector ($V_{approx\ x}$, $V_{approx\ y}$, $V_{approx\ z}$) resolved in the projectile's North East Down frame for a 155 nm projectile, spin stabilized about its minor axis with a spin rate of 100 Hz. A $4^{th}$-order low-pass filter was used to estimate the projectile's speed from the aerodynamic drag force component of the accelerometer measurements, equation (3.7).

The projectile's velocity vector and angular velocity vector are assumed to be aligned when resolved in the projectile's body frame, so $$v^b = \|v^b\| \frac{\omega^b}{\|\omega^b\|}. \tag{3.22}$$

The direction of the projectile's angular velocity vector in the projectile's body frame is determined as follows. Equation (2.41) is filtered by a high-pass filter, and from equations (2.42) and (2.44)

$$\text{high-pass}(f_{sx}^b) \approx \frac{\rho S \|\vec{v}\|^2 r_{px} C_{L\alpha}}{2J_z}(\beta r_y + \alpha r_z) + 2\omega_x(\omega_y r_y + \omega_z r_z). \tag{2.42}$$

The origin of the sensor measurement frame is assumed to be in the $\hat{x}_b$-$\hat{y}_b$ plane, the accelerometer measurement axis is assumed to be nominally aligned with the $\hat{x}_b$-axis, then $\omega_x$ dominates equation (2.42), and $$r_z = 0 \tag{3.23}$$

$$\text{high-pass}(f_{sx}^b) \approx 2\omega_x\omega_y r_y = 2\omega_x[\,0 \;\; r_y \;\; 0\,]\omega^b.$$

The local Earth magnetic field vector $$\dot{\vec{m}} = \dot{\vec{m}}|_b + \vec{\omega} \times \vec{m} \tag{3.24}$$

is differentiated.

The local Earth magnetic field vector is assumed to be constant throughout the projectile's flight time, so $$\dot{\vec{m}} = \vec{0} \tag{3.25}$$

Equation (3.25) is substituted into equation (3.24), so $$\dot{\vec{m}}|_b = -\vec{\omega} \times \vec{m} = \vec{m} \times \vec{\omega} \tag{3.26}$$

Equation (3.26) is resolved in the projectile's body frame, so $$\dot{m} = m^{b\times}\omega^b \tag{3.27}$$

Equations (3.23) and (3.27) are combined, so $$\begin{bmatrix} \dfrac{\text{high-pass}(f_{sx}^b)}{2\omega_x} \\ \dot{m}^b \end{bmatrix} = \begin{bmatrix} [\,0 \;\; r_y \;\; 0\,] \\ m^{b\times} \end{bmatrix} \omega^b. \tag{3.28}$$

By defining $$A = \begin{bmatrix} [\,0 \;\; r_y \;\; 0\,] \\ m^{b\times} \end{bmatrix} \tag{3.29}$$

$$y = \begin{bmatrix} \dfrac{\text{high-pass}(f_{sx}^b)}{2\omega_x} \\ \dot{m}^b \end{bmatrix}$$

and substituting equation (3.29) into equation (3.28), then $$\begin{aligned} A\omega^b &= y \\ A^T A\omega^b &= A^T y \\ \omega^b &= (A^T A)^{-1} A^T y. \end{aligned} \tag{3.30}$$

The matrix $A^TA$ is $$\begin{aligned} A^T A &= \left[ \begin{bmatrix} 0 \\ r_y \\ 0 \end{bmatrix} \;\; -m^{b\times} \right] \begin{bmatrix} [\,0 \;\; r_y \;\; 0\,] \\ m^{b\times} \end{bmatrix} \\ &= \begin{bmatrix} 0 \\ r_y \\ 0 \end{bmatrix} \begin{bmatrix} 0 \\ r_y \\ 0 \end{bmatrix}^T - (m^{b\times})^2. \end{aligned} \tag{3.31}$$

The matrix $A^TA$ is singular if $\vec{m}$ resolved in the projectile's body frame is in the $\hat{x}_b$–$\hat{z}_b$. This 3D attitude occurs twice during the projectile's rotation about the $\hat{x}_b$-axis. Therefore, a small constant $\epsilon^2 I$ is added to $A^TA$ to ensure the resulting matrix is non-singular. The matrix $A^Ty$ is written as:

$$\begin{aligned} A^T y &= \left[ \begin{bmatrix} 0 \\ r_y \\ 0 \end{bmatrix} \;\; -m^{b\times} \right] \begin{bmatrix} \dfrac{\text{high-pass}(f_{sx}^b)}{2\omega_x} \\ \dot{m}^b \end{bmatrix} \\ &= \begin{bmatrix} 0 \\ r_y \\ 0 \end{bmatrix} \frac{\text{high-pass}(f_{sx}^b)}{2\omega_x} + \dot{m}^{b\times} m^b. \end{aligned} \tag{3.32}$$

Equations (3.31) and (3.32) are substituted into equation (3.30), then $$\omega^b = \left( \begin{bmatrix} 0 \\ r_y \\ 0 \end{bmatrix} \begin{bmatrix} 0 \\ r_y \\ 0 \end{bmatrix}^T - (m^{b\times})^2 + \varepsilon^2 I \right)^{-1} \left( \begin{bmatrix} 0 \\ r_y \\ 0 \end{bmatrix} \frac{\text{high-pass}(f_{sx}^b)}{2\omega_x} + \dot{m}^{b\times} m^b \right). \tag{3.33}$$

Thus, it has been shown how to determine the scalar components of the local Earth magnetic field vector and the projectile's velocity vector in the projectile's NED frame and body frame. The projectile's attitude and heading angle is computed from $\hat{C}_{bN\_final}$ shown in equation (3.1).

Figure 9:
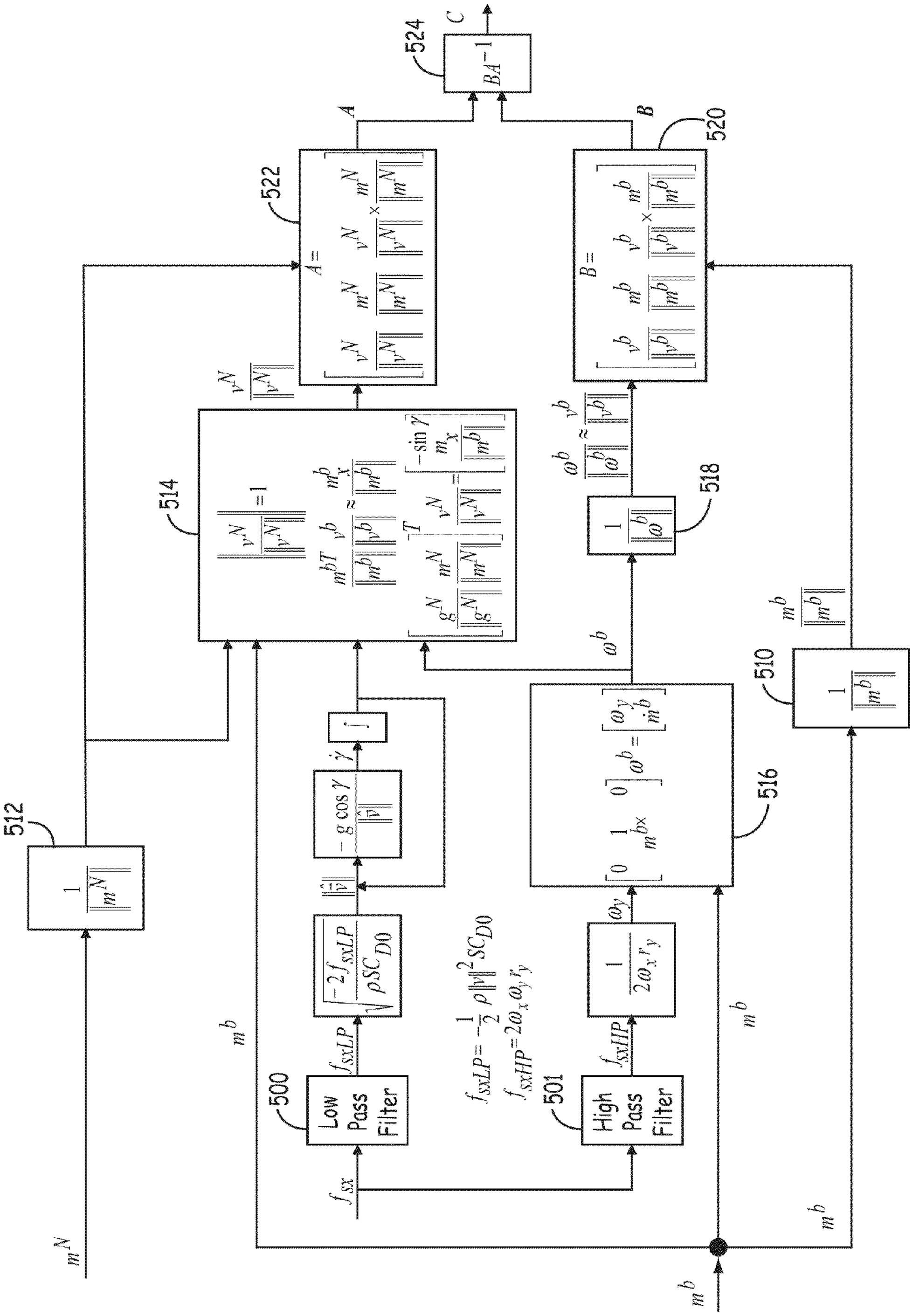
FIG. 9 is a flow diagram of the vector matching algorithm.

FIG. 9 is a flow diagram of the vector matching algorithm 133. The input to the low-pass filter 500 and the high-pass filter 501 is $f_{sx}$, from the single axis accelerometer 120. The magnetic field measurement $m^b$ is input to the algorithm 510. The magnetic field for the inertial frame $m^N$ provided or measured prior to launch of the projectile 100 is input to the algorithm 512. The algorithm 514 is used to calculate the direction of the velocity unit vector for the unit sphere and the two planes. The output of algorithm 514 is the velocity unit vector $$\frac{\hat{v}^N}{\|\hat{v}^N\|}$$

in the inertial frame which is input to algorithm 522. The output of the algorithm 516 is the angular velocity vector $\omega^b$ in the body frame. The output from algorithm 518 is the direction of the velocity unit vector $$\frac{\hat{v}^b}{\|\hat{v}^b\|}$$

in the body frame, which is input to the algorithm 520. The output of algorithm 520 times the inverse of the output of the algorithm 522 (see algorithm 524) is the direction cosine matrix $C_{bN}$ from which the projectile's attitude and heading angle are computed.

The fast spinning projectile attitude and heading angle reference system (AHRS) algorithm (also referred to herein as attitude estimator module 130) developed above is now simulated for an exemplary embodiment of a projectile 100. The fast spinning projectile AHRS algorithm performance is evaluated in estimating the attitude and heading angle of the projectile 100, to identify the error sources of the AHRS algorithm, and to quantify the effect of the errors sources on the performance of the AHRS algorithm.

The following discussion is based on a simulation of a fast spinning projectile having the following characteristics:

$$m_b = 45\text{ kg} \tag{4.1}$$
$$\text{diameter} = 0.155\text{ m}$$
$$\text{length} = 0.8\text{ m}$$
$$J = \begin{bmatrix} 0.136 & 0 & 0 \\ 0 & 2.483 & 0 \\ 0 & 0 & 2.483 \end{bmatrix}\text{kgm}^2$$

$$C_{DO} = 0.3 \tag{4.2}$$
$$C_{L\alpha} = 2.7/\text{rad}$$
$$C_{M\alpha} = 1/\text{rad}$$
$$C_{LP} = C_{MQ} = C_{NR} = -0.1\text{ rad/s}.$$

The following discussion is based on the fast spinning projectile having the following trajectory characteristics:

$$\rho = 1\text{ kg/m}^3 \tag{4.3}$$
$$\gamma(0) = 36^\circ$$
$$\|\vec{v}\| = 620\text{ m/s in }\hat{x}_b\text{-axis direction}$$
$$\omega_x(0) = 100\text{ Hz.}$$

Figure 10:
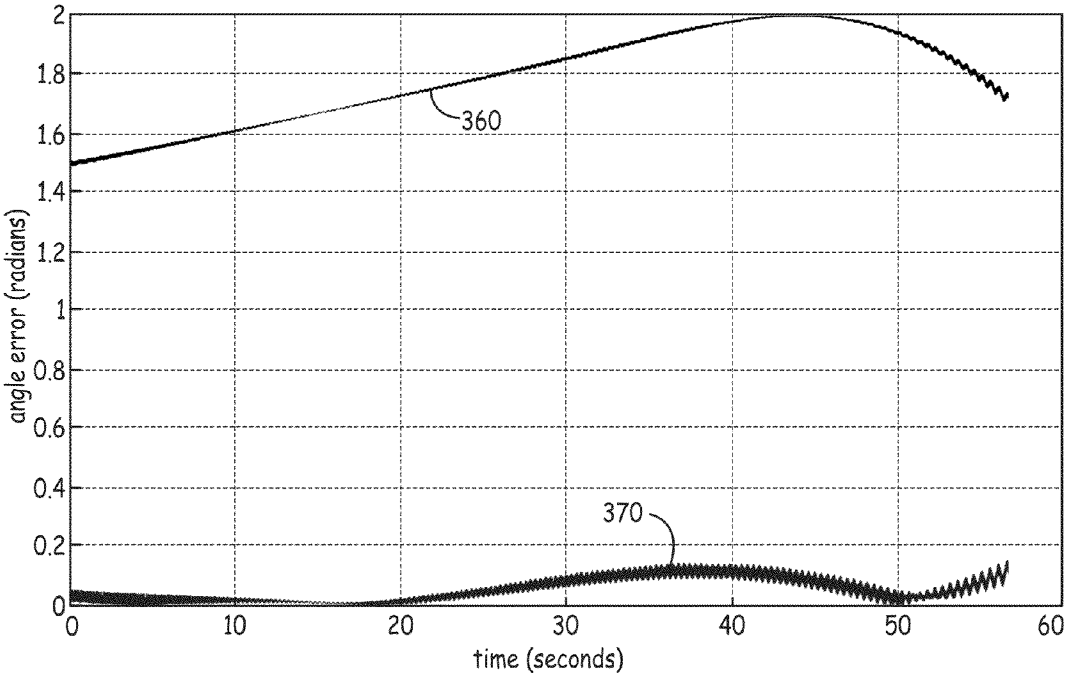
FIG. 10 shows the plots of the direction cosine matrix estimation error computed using the vector matching algorithm.

Since a number of assumptions and simplifications were used to derive the fast spinning projectile AHRS algorithm, the estimation error of the direction cosine matrix estimation errors computed using the vector matching algorithm 133 (shown in FIG. 9) are plotted. FIG. 10 shows the plots of the direction cosine matrix estimation error computed using the vector matching algorithm 133. The direction cosine matrix estimation error was computed as follows $$\delta C = \|I - (\hat{C}_{bN\_final})^T C_{bN}\| \tag{4.4}$$

Figure 11:
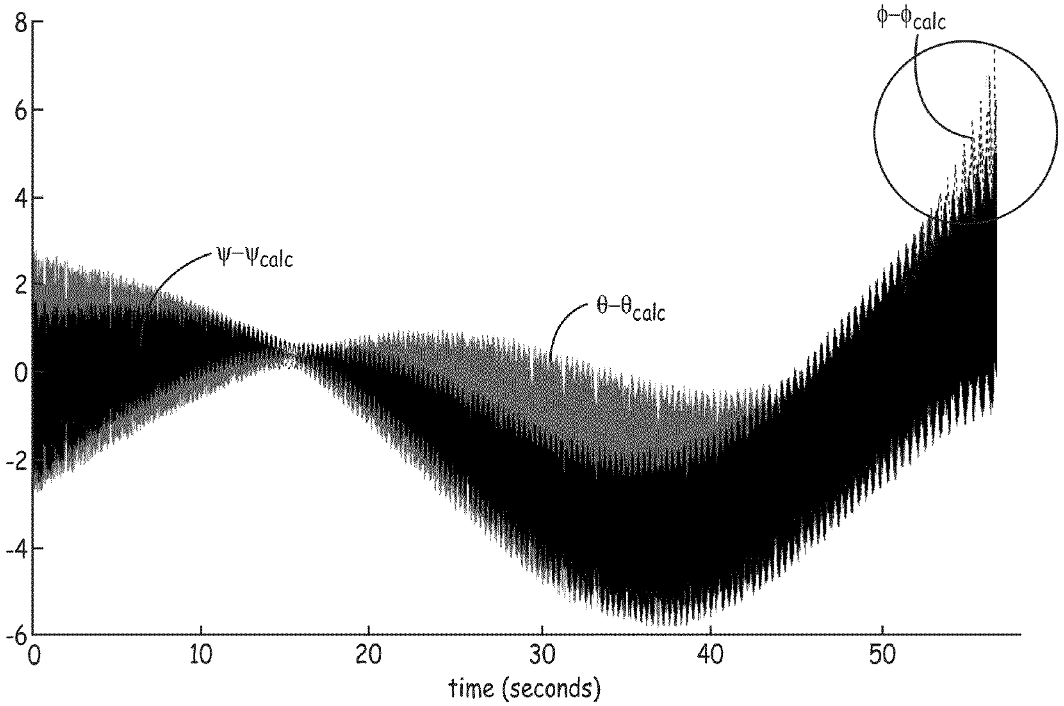
FIG. 11 shows the plots of the Euler angle estimation errors computed using the vector matching algorithm.

FIG. 11 shows the estimation errors of the Euler Angles $(\phi-\phi_{calc})$, $(\theta-\theta_{calc})$, and $(\psi-\psi_{calc})$ and computed using the vector matching algorithm 133. The plot of $(\phi-\phi_{calc})$ is hidden by the plot of $(\psi-\psi_{calc})$ except where indicated in the region past 50 seconds. As shown in FIG. 11, the maximum Euler angle errors $(\phi-\phi_{calc})$, $(\theta-\theta_{calc})$, and $(\psi-\psi_{calc})$ are less than 0.1 radians for the projectile's entire flight.

The methods and techniques described here may be implemented in digital electronic circuitry, or with a processor 140 (for example, a special-purpose processor or a general-purpose processor such as a computer, microprocessor, or microcontroller) firmware, software, or in combinations of them. In one implementation, the processor 140 comprises processor support chips and/or system support chips such as application-specific integrated circuits (ASICs). Apparatus embodying these techniques may include appropriate input and output devices, a programmable processor, and a storage medium 131 tangibly embodying program instructions for execution by the programmable processor. A process embodying these techniques may be performed by a processor 140 executing a program of instructions to perform desired functions by operating on input data and generating appropriate output. The techniques may advantageously be implemented in one or more programs that are executable on a programmable system including at least one programmable processor 140 coupled to receive data and instructions from, and to transmit data and instructions to, a data storage system, at least one input device, and at least one output device. Generally, the processor 140 receives instructions and data from a memory 135, such as a read-only memory and/or a random access memory.

The attitude estimator module 130 (software 130) comprises a set of program instructions embodied on the storage medium 131 from which at least a portion of the program instructions are read by the processor 140 for execution thereby. The program instructions, when executed by the processor 140, carry out at least a portion of the functionality described here as being performed by the apparatus 10.

Storage devices suitable for tangibly embodying computer program instructions and data include all forms of non-volatile memory, including by way of example semiconductor memory devices, such as EPROM, EEPROM, USB memory devices (i.e., thumb drives) and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Figure 12:
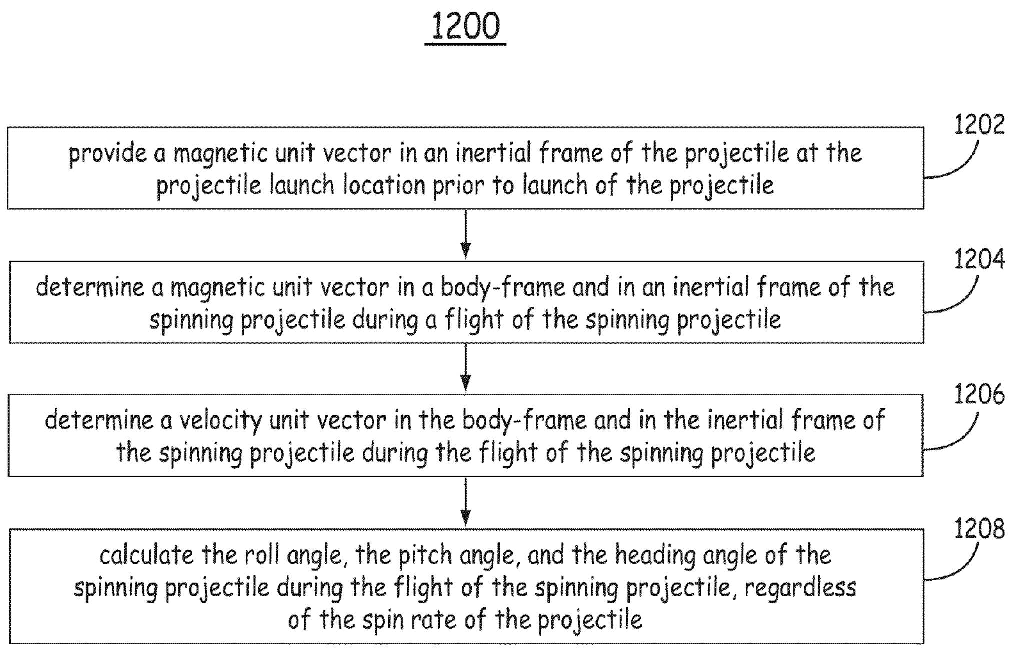
FIG. 12 is a flow diagram of one embodiment of a method to measure and determine a three-dimensional attitude of a spinning projectile during a flight of the spinning projectile in accordance with the present invention.

FIG. 12 is a flow diagram of one embodiment of a method 1200 to measure and determine a three-dimensional attitude of a spinning projectile during a flight of the spinning projectile in accordance with the present invention. The embodiment of method 1200 is described as being implemented using the apparatus 10 of FIG. 2 in a projectile 100 of FIGS. 1 and 3. In such an embodiment, at least a portion of the processing of method 1200 is performed by the attitude estimator module 130 executing on the processor 140 of the apparatus 10.

At block 1202, a magnetic unit vector in an inertial frame of the projectile 100 at the projectile launch location 4 is provided prior to launch of the projectile 100. In one implementation of this embodiment, the magnetic unit vector in an inertial frame of the projectile 100 at the projectile launch location 4 is stored in the memory 135 prior to launch.

At block 1204, a magnetic unit vector is determined in a body frame and in an inertial frame of the spinning projectile 100 during a flight of the spinning projectile 100. The magnetic unit vector is determined by measuring a body-axis magnetic vector $m^b$ using the three-axis magnetometer 100 during the flight of the projectile 100 and by executing algorithms, such as algorithms in the attitude estimator module 130, at a processor 140 on board the projectile 100. The algorithms use the magnetic unit vector $m^N$ of the inertial frame stored in the memory 135.

At block 1206, a velocity unit vector is determined in the body frame $F_b$ and in the inertial frame $F_N$ of the spinning projectile 100 during the flight of the spinning projectile 100. The velocity unit vector is determined in the body frame $F_b$ and in the inertial frame $F_N$ of the spinning projectile by measuring the specific force acting on the projectile using a single-axis accelerometer 120 having a sense axis 121 aligned with a spin axis $X_p$ of the spinning projectile 100 and by determining a flight path angle $\gamma$ as a function of time for the spinning projectile based on the measured specific force. The flight path angle $\gamma$ is determined as a function of time of the spinning projectile 100 by applying a low-pass filter 129 to an accelerometer output to estimate drag on the spinning projectile 100. Determining the velocity unit vector in the inertial frame $F_N$ based on the approximate flight path angle $\gamma$ includes solving for the velocity unit vector as an intersection of a unit sphere 200 and two planes. A line formed from the two intersecting planes intersects the unit sphere 200 in two points. One of the two points is selected based on a direction of launch of the projectile (i.e., eastward or westward launching). The parameters of the line intersecting the unit sphere are calculated. The direction of the velocity unit vector in the body frame $F_b$ is also determined based on the assumption that the velocity unit vector is parallel to the angular velocity unit vector in the body frame. The angular velocity unit vector is determined by high-pass filtering the single-axis accelerometer measurements and by calculating the time derivative of the local Earth magnetic field vector in the inertial frame and body frame. Typically, low-cost rate gyroscopes are unable to directly measure the angular velocity of a projectile spinning at rates greater than 100 Hz. In applications where the low-cost rate gyroscopes are able to measure the angular velocity of the spinning projectile, the angular velocity unit vector in the body frame is determined directly from the angular velocity measurements.

At block 1208, the roll angle, the pitch angle, and the heading angle of the spinning projectile are calculated during the flight of the spinning projectile, regardless of the spin rate of the projectile 100. The roll angle and the pitch angle of the spinning projectile comprise an attitude of the spinning projectile. The attitude and the heading angle of the spinning projectile are calculated by: generating a direction cosine matrix C by matching the magnetic unit vector and velocity unit vector in the body frame with the magnetic unit vector and velocity unit vector in the inertial frame; solving Wahba's problem for the direction cosine matrix C; and calculating the attitude and the heading angle from the direction cosine matrix. The correct solution to Wahba's problem is the attitude and the heading angle of the spinning projectile 100.

In this manner, an accurate, reliable, and low-cost guidance, navigation, and control capability for projectiles that includes an attitude and heading angle reference system (apparatus 10 or 11) is used to determine the roll angle and pitch angle (attitude), and heading angle of a spinning projectile during a flight of the spinning projectile even for fast spinning projectiles, such as gun-launched projectiles with initial angular velocities greater than 100 Hz.

Although specific embodiments have been described herein, it will be appreciated by those of skill in the art that other algorithms and protocols for a master-slave wireless network may be substituted for the specific embodiments described. This application is intended to cover any adaptations and variations of the present invention. Therefore it is manifestly intended that this invention be limited only by the claims and the equivalents thereof.

What is claimed is:

1. A method to determine roll angle, pitch angle, and heading angle of a spinning projectile during a flight of the spinning projectile, the method comprising:

providing a magnetic unit vector in an inertial frame of the projectile at a projectile launch location prior to launch of the projectile;

determining a magnetic unit vector in a body frame and in an inertial frame of the spinning projectile during the flight of the spinning projectile;

determining a velocity unit vector in the body frame and in the inertial frame of the spinning projectile during the flight of the spinning projectile; and calculating the roll angle, the pitch angle, and the heading angle of the spinning projectile during the flight of the spinning projectile, regardless of the spin rate of the projectile, wherein the roll angle and the pitch angle of the spinning projectile comprise an attitude of the spinning projectile.

2. The method of claim 1, wherein determining the magnetic unit vector in the body frame and in the inertial frame of the spinning projectile comprises:

measuring a body-axis magnetic vector using a three-axis magnetometer during the flight of the projectile; and executing algorithms at a processor on board the projectile, wherein the algorithms use the magnetic unit vector in the inertial frame at the projectile launch location.

3. The method of claim 1, wherein determining the velocity unit vector in the body frame and in the inertial frame of the spinning projectile comprises:

measuring a specific force using a single-axis accelerometer having a sense axis aligned with a spin axis of the spinning projectile; and determining a flight path angle as a function of time for the spinning projectile based on the measured specific force.

4. The method of claim 3, further comprising:

applying a low-pass filter to an output of the single-axis accelerometer to estimate drag on the spinning projectile; and determining a magnitude of a velocity vector, wherein the determining the flight path angle is based on the determined magnitude of the velocity vector.

5. The method of claim 3, wherein the determining the velocity unit vector in the inertial frame is based on the determined flight path angle, the method further comprising:

solving for the velocity unit vector as an intersection of a unit sphere and two planes, wherein a line formed from the two intersecting planes intersects the unit sphere in two points;

selecting one of the two points based on a direction of launch of the projectile; and calculating the parameters of the line intersecting the unit sphere.

6. The method of claim 5, further comprising:

assuming the velocity unit vector in the inertial frame is parallel to the angular velocity unit vector in the body frame;

applying a high-pass filter to an output of the single-axis accelerometer;

calculating the time derivative of the local Earth magnetic field vector in the inertial frame and the body frame;

generating the angular velocity unit vector in the body frame based on output from the high-pass filter and the time derivatives of the local Earth magnetic field vector; and determining a direction of the velocity unit vector in the body frame based on the generated angular velocity unit vector in the body frame.

7. The method of claim 1, wherein calculating the roll angle, the pitch angle, and the heading angle of the spinning projectile comprises:

generating a direction cosine matrix by matching the magnetic unit vector and the velocity unit vector in the body frame with the magnetic unit vector and the velocity unit vector in the inertial frame;

solving Wahba's problem for the direction cosine matrix; and calculating the roll angle, the pitch angle, and the heading angle from the direction cosine matrix, wherein the correct solution to Wahba's problem is the roll angle, the pitch angle, and the heading angle of the spinning projectile.

8. The method of claim 1, further comprising:

aligning a sense axis of a single-axis accelerometer with a spin axis of the spinning projectile;

filtering output from the single-axis accelerometer to determine drag acting on the spinning projectile;

determining a magnitude of the velocity unit vector of the spinning projectile; and determining an angular velocity unit vector of the spinning projectile.

9. The method of claim 8, wherein filtering output from the single-axis accelerometer includes filtering output from the single-axis accelerometer positioned on the spinning projectile spinning at a spin rate greater than 100 revolutions per second.

10. The method of claim 1, further comprising orienting a sense axis of a single-axis accelerometer parallel to a spin axis of the projectile prior to launch of the projectile.

11. The method of claim 1, wherein calculating the roll angle, the pitch angle, and the heading angle of the spinning projectile includes calculating the roll angle, the pitch angle, and the heading angle of the projectile spinning more than 100 revolutions per second.

12. An apparatus to measure a three-dimensional attitude of a spinning projectile during a flight of the spinning projectile, the apparatus including:

a three-axis magnetometer to measure the magnetic field of earth;

a single-axis accelerometer having a sense axis parallel to a spin axis of the spinning projectile during the flight of the spinning projectile; and an attitude estimator module;

at least one processor to receive outputs from the three-axis magnetometer and the single-axis accelerometer and to execute at least one algorithm in the attitude estimator module to determine an attitude and heading angle of the spinning projectile during the flight of the spinning projectile, regardless of a spin rate of the projectile, based on outputs from the three-axis magnetometer and the single-axis accelerometer, wherein the attitude and the heading angle comprise the three-dimensional attitude.

13. The apparatus of claim 12, further comprising a Kalman filter to receive output from the attitude estimator module, wherein the Kalman filter computes estimates of the attitude and the heading angle of the spinning projectile.

14. The apparatus of claim 12, wherein the attitude estimator receives from the three-axis magnetometer information indicative of a local Earth magnetic field vector at the projectile launch site prior to launch, and wherein the attitude estimator module includes the at least one algorithm to:

use a low-pass filter on accelerometer measurements to compute the drag acting on the projectile;

estimate a velocity unit vector in the inertial frame;

estimate a velocity unit vector in the body frame;

generate two 3×3 unit vector matrices;

invert one 3×3 unit vector matrix;

multiply one 3×3 unit vector matrix with the inverted 3×3 unit vector matrix to solve for Wahba's problem; and use a singular value decomposition to generate a direction cosine matrix from the direction cosine matrix calculated to solve Wahba's problem in order to enforce orthogonality constraints on the direction cosine matrix calculated to solve Wahba's problem.

15. The apparatus of claim 12, further comprising a Kalman filter communicatively coupled to receive output from the attitude estimator module.

16. A non-transitory computer readable medium embodying a program of instructions executable by a processor to perform a method comprising:

determining a magnetic unit vector in a body frame and in an inertial frame of the spinning projectile during a flight of the spinning projectile;

determining a velocity unit vector in the body frame and in the inertial frame of the spinning projectile during the flight of the spinning projectile; and calculating a roll angle, a pitch angle, and a heading angle of the spinning projectile during the flight of the spinning projectile, regardless of a spin rate of the projectile, wherein the roll angle, the pitch angle, and the heading angle of the spinning projectile comprise a three-dimensional attitude of the spinning projectile.

17. The medium of claim 16, comprising the program of instructions executable by the processor to perform the method, which further comprises:

solving for the velocity unit vector in the inertial frame as an intersection of a unit sphere and two planes, wherein a line formed from the two intersecting planes intersects the unit sphere in two points;

selecting one of the two points based on a direction of launch of the projectile; and calculating parameters of the line intersecting the unit sphere.

18. The medium of claim 17, comprising the program of instructions executable by the processor to perform the method, which further comprises:

applying a high-pass filter to an output of the single-axis accelerometer;

calculating the time derivative of the local Earth magnetic field vector in the inertial frame and the body frame generating the angular velocity unit vector in the body frame based on output from the high-pass filter and the time derivatives of the local Earth magnetic field vector; and determining a direction of the velocity unit vector in the body frame based on the generated angular velocity unit vector in the body frame, wherein the velocity unit vector in the body frame is assumed to be parallel to the angular unit velocity in the body frame.

19. The medium of claim 17, comprising the program of instructions executable by the processor to perform the method, which further comprises:

generating a direction cosine matrix by matching the magnetic unit vector and the velocity unit vector in the body frame with the magnetic unit vector and the velocity unit vector in the inertial frame;

solving Wahba's problem for the direction cosine matrix; and calculating the roll angle, the pitch angle, and the heading angle from the direction cosine matrix, wherein the correct solution to Wahba's problem is the roll angle, the pitch angle, and the heading angle of the spinning projectile.

20. The medium of claim 16, comprising the program of instructions executable by the processor to perform the method, which further comprises:

using a low-pass filter on accelerometer measurements to compute the drag acting on the projectile;

estimating a velocity unit vector in the inertial frame;

estimating a velocity unit vector in the body frame;

generating two 3×3 unit vector matrices;

inverting one 3×3 unit vector matrix;

multiplying one 3×3 unit vector matrix with the inverted 3×3 unit vector matrix to solve for Wahba's problem; and using a singular value decomposition to generate a direction cosine matrix from the direction cosine matrix calculated to solve Wahba's problem in order to enforce orthogonality constraints on the direction cosine matrix calculated to solve Wahba's problem.

* * * * *